(12) United States Patent
Culp et al.

(10) Patent No.: US 12,471,829 B2
(45) Date of Patent: Nov. 18, 2025

(54) NEURAL SPATIOTEMPORAL DYNAMIC BARCODING AND METHODS OF ASSESSING CHANGES IN CORTICAL DYNAMICS USING THE SAME

(71) Applicant: UTI LIMITED PARTNERSHIP, Calgary (CA)

(72) Inventors: Jordan Michael Culp, Calgary (CA); Wilten Nicola, Calgary (CA); Alexander Robert Angus Mcgirr, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 19 days.

(21) Appl. No.: 18/120,672

(22) Filed: Mar. 13, 2023

(65) Prior Publication Data
US 2024/0306976 A1   Sep. 19, 2024

(51) Int. Cl.
*A61B 5/37*   (2021.01)
*A61B 5/00*   (2006.01)

(52) U.S. Cl.
CPC .............. *A61B 5/37* (2021.01); *A61B 5/0042* (2013.01)

(58) Field of Classification Search
CPC ................................................. A61B 5/0042
See application file for complete search history.

(56) References Cited

U.S. PATENT DOCUMENTS

2024/0285221 A1\* 8/2024 Korenblum .......... A61B 5/7267

OTHER PUBLICATIONS

Vanni et al., "Mesoscale Mapping of Mouse Cortex Reveals Frequency-Dependent Cycling between Distinct Macroscale Functional Modules," (Aug. 2, 2017), Journal of Neuroscience, 37 (31) 7513-7533. (Year: 2017).\*
Wilsenach et al., "Ranking of communities in multiplex spatiotemporal models of brain dynamics," (Mar. 14, 2022), Applied Network Science vol. 7, Article No. 15 (2022). (Year: 2022).\*
Saggar et al., "Towards a new approach to reveal dynamical organization of the brain using topological data analysis," (Apr. 11, 2018). (Year: 2018).\*
Gordon, E. M. et al. Precision Functional Mapping of Individual Human Brains. Neuron 95, 791-807 e797 (2017).
Salkoff, D. B., Zagha, E., McCarthy, E. & McCormick, D. A. Movement and Performance Explain Widespread Cortical Activity in a Visual Detection Task. Cereb Cortex 30, 421-437 (2020).
Kang, M. et al. Momentary level of slow default mode network activity is associated with distinct propagation and connectivity patterns in the anesthetized mouse cortex. J Neurophysiol 119, 441-458 (2018).
Urai, A. E., Doiron, B., Leifer, A. M. & Churchland, A. K. Large-scale neural recordings call for new insights to link brain and behavior. Nat Neurosci 25, 11-19 (2022).
Wiltschko, A. B. et al. Mapping Sub-Second Structure in Mouse Behavior. Neuron 88, 1121-1135 (2015).
Plötz, T. & Fink, G. A. Markov models for offline handwriting recognition: a survey. International Journal on Document Analysis and Recognition (IJDAR) 12, 269-298 (2009).

(Continued)

*Primary Examiner* — Keith M Raymond
*Assistant Examiner* — Ashish S Jasani

(57) ABSTRACT

Methods of generating, visualizing and comparing Markovian neural barcodes mesoscale cortical spatiotemporal data are provided.

6 Claims, 27 Drawing Sheets

(56) References Cited

OTHER PUBLICATIONS

Avitan, L. & Stringer, C. Not so spontaneous: Multi-dimensional representations of behaviors and context in sensory areas. Neuron 15, 00588-00588 (2022).
Xiao, D. et al. Mapping cortical mesoscopic networks of single spiking cortical or sub-cortical neurons. Elife 6, 19976 (2017).

* cited by examiner

NEURAL SPATIOTEMPORAL DYNAMIC BARCODING AND METHODS OF ASSESSING CHANGES IN CORTICAL DYNAMICS USING THE SAME

FIELD OF THE INVENTION

This invention pertains generally to neural spatiotemporal dynamic barcoding and methods of assessing changes in cortical dynamics using the same and, more particularly to methods of generating and comparing Markovian neural barcodes representing cortical spatiotemporal dynamics.

BACKGROUND OF THE INVENTION

Brain activity is highly structured and reflective of the behavioral and the physiological state of the animal[1]. Changes in brain activity including spontaneous resting brain activity have been observed in dementia including Alzheimer's Disease, major depressive disorder, epilepsy, and PTSD and may be indicative of disease progression. Stimuli and pharmaceuticals also impact brain activity.

The mesoscale connectome describes connections at the cellular level, between neuronal types across different brain regions. Mesoscale cortical imaging reveals recurrent and stereotyped patterns of complex activity involving anatomically and functionally distinct regions of the neocortex, "motifs"[4-7]. These stereotyped motifs define large scale networks and reflect the animal's internal state as well as previous experience[8-11].

How these motifs transition over time provides a novel lens from which to view the structure of brain activity. Though a stochastic temporal structure is possible, recurrent patterns of activity are thought to have functional significance[12-14]. Currently, large-scale brain activity is commonly described as functional connectomes, defined by correlated regional time-varying signals occurring as the sequence of activity motifs unfolds[15]. By averaging across time to represent dynamical relationships, it is possible for many dynamical processes to lead to identical functional connectomes, including any sequence of motifs that progress in reverse or random order. By analogy, time is also often collapsed in behavioral experiments, for instance the amount of time a rodent spends on a dark part of an elevated maze relative to the brightly lit part can be interpreted as anxiety-like behavior[16]. Yet, a sedated animal that spends the entire trial on either a brightly lit or a dark part of the maze is not more or less anxious, it is simply unable to effectively initiate and sequence behavior[17].

There exists a need to quantify and visualize the temporal structure of stereotyped activity motifs of brain function. There further exists a need to identify and visualize changes in the temporal structure of stereotyped activity motifs of brain function as a means of monitoring changes in brain activity resulting from pathological processes.

SUMMARY OF THE INVENTION

An object of the present invention is to provide neural spatiotemporal dynamic barcoding and methods of assessing changes in cortical dynamics using the same. In accordance with an aspect of the invention, there is provided a method of visualizing cortical spatiotemporal dynamics, the method comprising acquiring spatiotemporal data from a subject's brain, wherein the spatiotemporal data comprises a plurality of image frames (or volumes) in sequence; registering the spatiotemporal data to a predetermined anatomical reference to obtain registered spatiotemporal data comprising a plurality of registered image frames in sequence; randomly sampling the plurality of registered image frames to obtain a sample of registered image frames; clustering the sample of registered image frames (or volumes) into discrete states; matching the discrete states to registered image frames (or volumes) in the registered spatiotemporal data; estimate probability of occupying one of the discrete states and transition between states; and pool data to form neural bar code.

In accordance with another aspect of the invention, there is provided a method of visualizing cortical spatiotemporal dynamics comprising acquiring dynamic imaging from a subject's brain, applying a state-space discretization to the dynamic imaging to obtain a plurality of zones, wherein each zone in the plurality of zones is a cluster of interest, tracking dynamics in the imaging from one zone to a next zone; creating a transitional probability matrix to define the probability of crossing from one zone to the next zone, determining an occupancy distribution of each zone, and constructing, by the processing device, a neural barcode by unwrapping each transition probability matrix row by row and concatenating with the occupancy distribution; and displaying the neural barcode. Optionally, in some embodiments the imaging is mesoscale imaging.

In some embodiments, the imaging is magnetic resonance imaging. In other embodiments, the neural data is sampled using current or electrical signals.

In accordance with another aspect of the invention, there is provided a method of assessing for a change in cortical spatiotemporal dynamics, the method comprising comparing a first neural barcode and a second neural barcode.

BRIEF DESCRIPTION OF THE DRAWINGS

These and other features of the invention will become more apparent in the following detailed description in which reference is made to the appended drawings.

Figure 6:
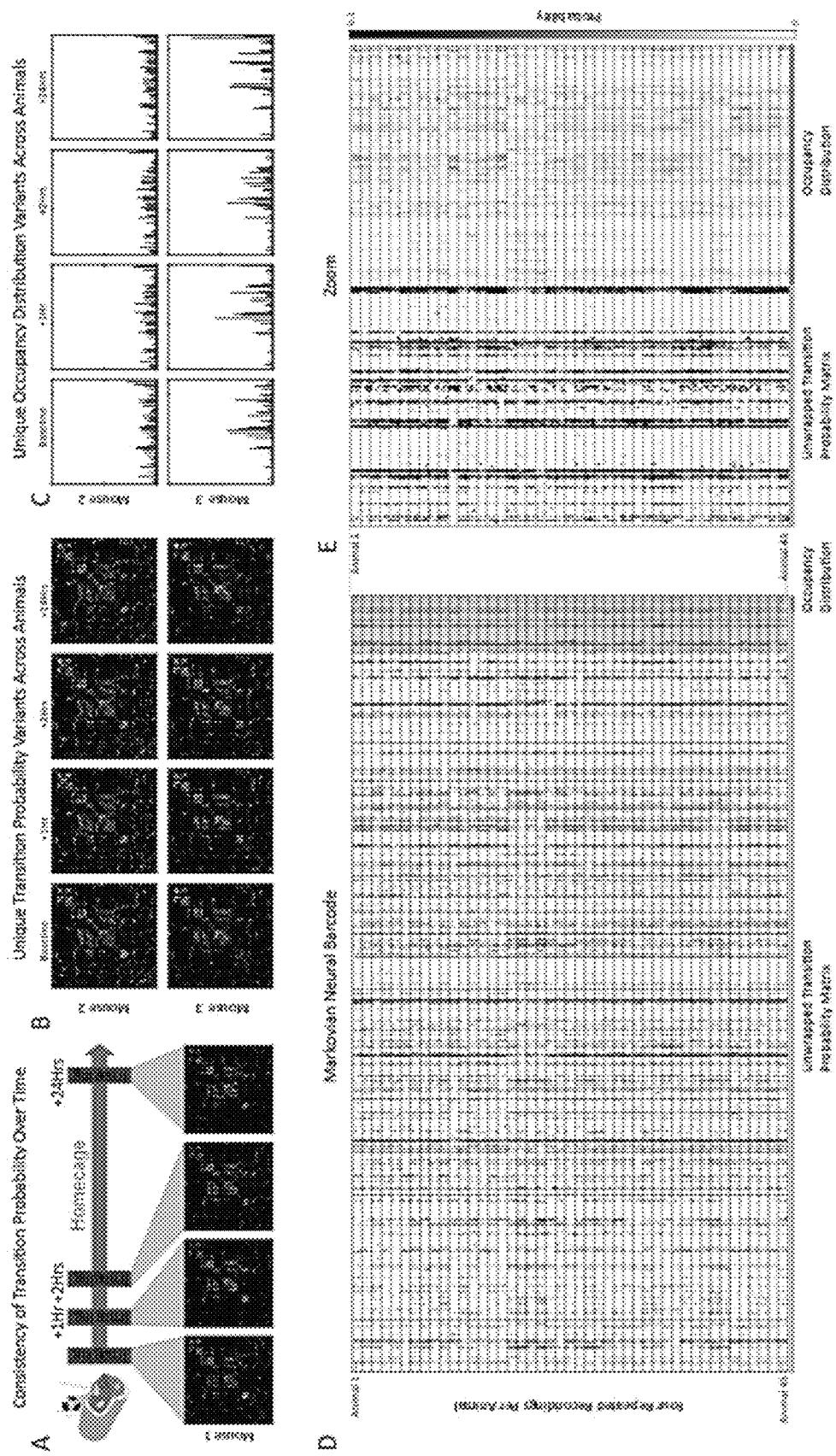
FIG. 6 illustrates a Markovian neural barcode is sensitive to individual animal specific dynamical signatures. (A) A schematic image illustrating the experimental protocol in which animals were repeatedly imaged within and across days, and the associated transition probability matrices for these four recordings. (B) Transition probability matrices for two mice illustrate a conserved 'grammar' as well as unique animal specific features that are consistently observed across recordings. (C) The occupancy distributions for the same two mice reveals that the common 'grammar' emerges despite unique occurrences of Markov Elements. (D) The Markovian neural barcode represents the unwrapped transition probability matrix and occupancy distribution. This is illustrated for n=180 recordings from n=45 mice and reveals a common 'grammar' as well as individual specific banding consistent with individual specific dynamical signatures. (E) A zoomed view of the Markovian neural barcode illustrates the unwrapped transition probability matrix on the left and occupancy distribution on the right. (F) Using principal component dimension reduction of the Markovian neural barcode, it is seen that recordings from the same animal have unique dynamical features and cluster. (G) A principal component distance matrix in which the n=180 recordings from n=45 mice are illustrated reveals a block structure consistent with individual dynamical signatures revealed by the Markovian neural bar code. (H) A schematic representation illustrates the intra-inter individual analytical approach and predictions based on the presence and absence of individual specific signatures within the Markovian neural barcode. (I) Statistical quantification of the greater principal component distance between animals than within animal recordings.
Figure 6:
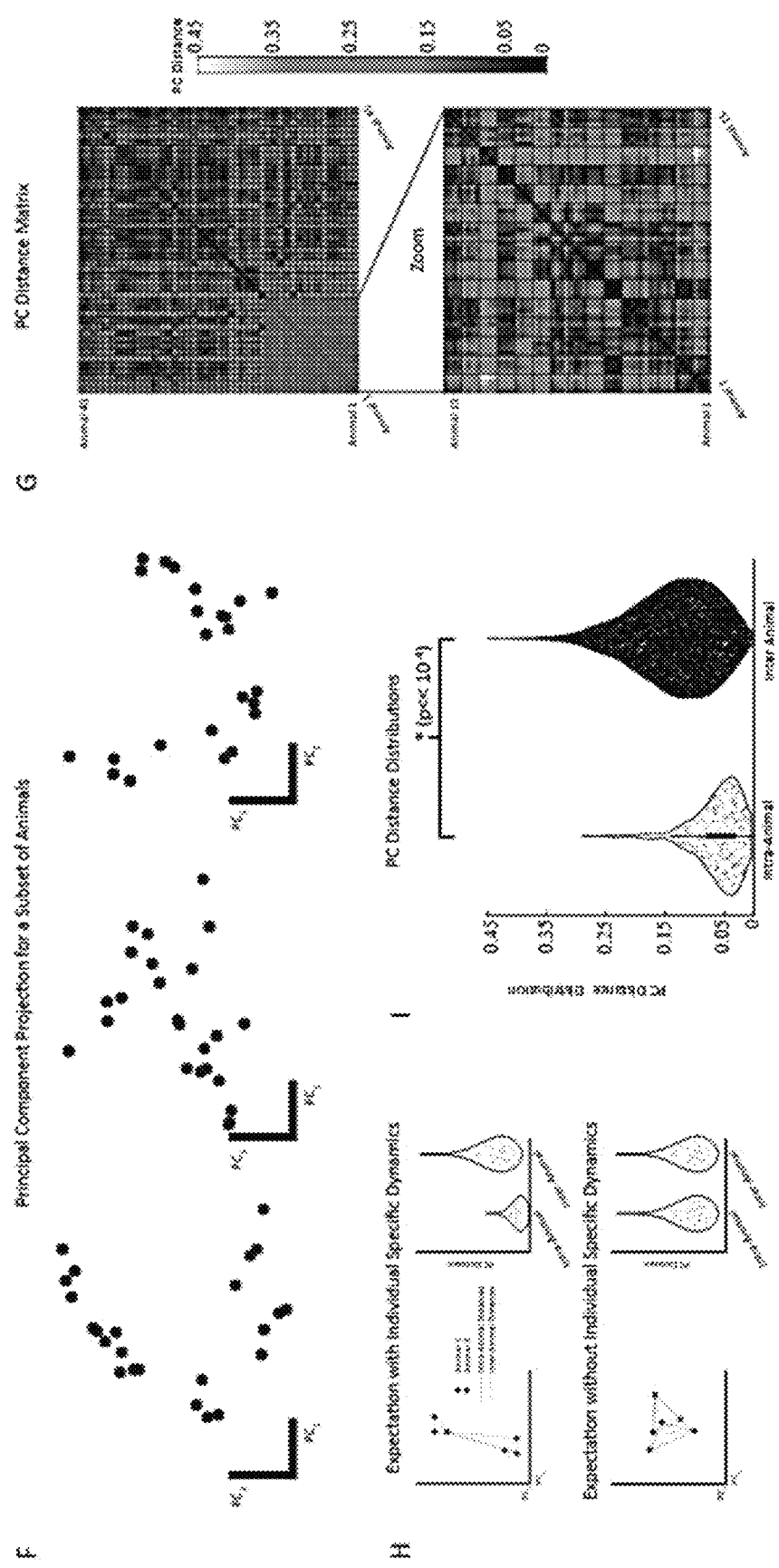
Figure 11:
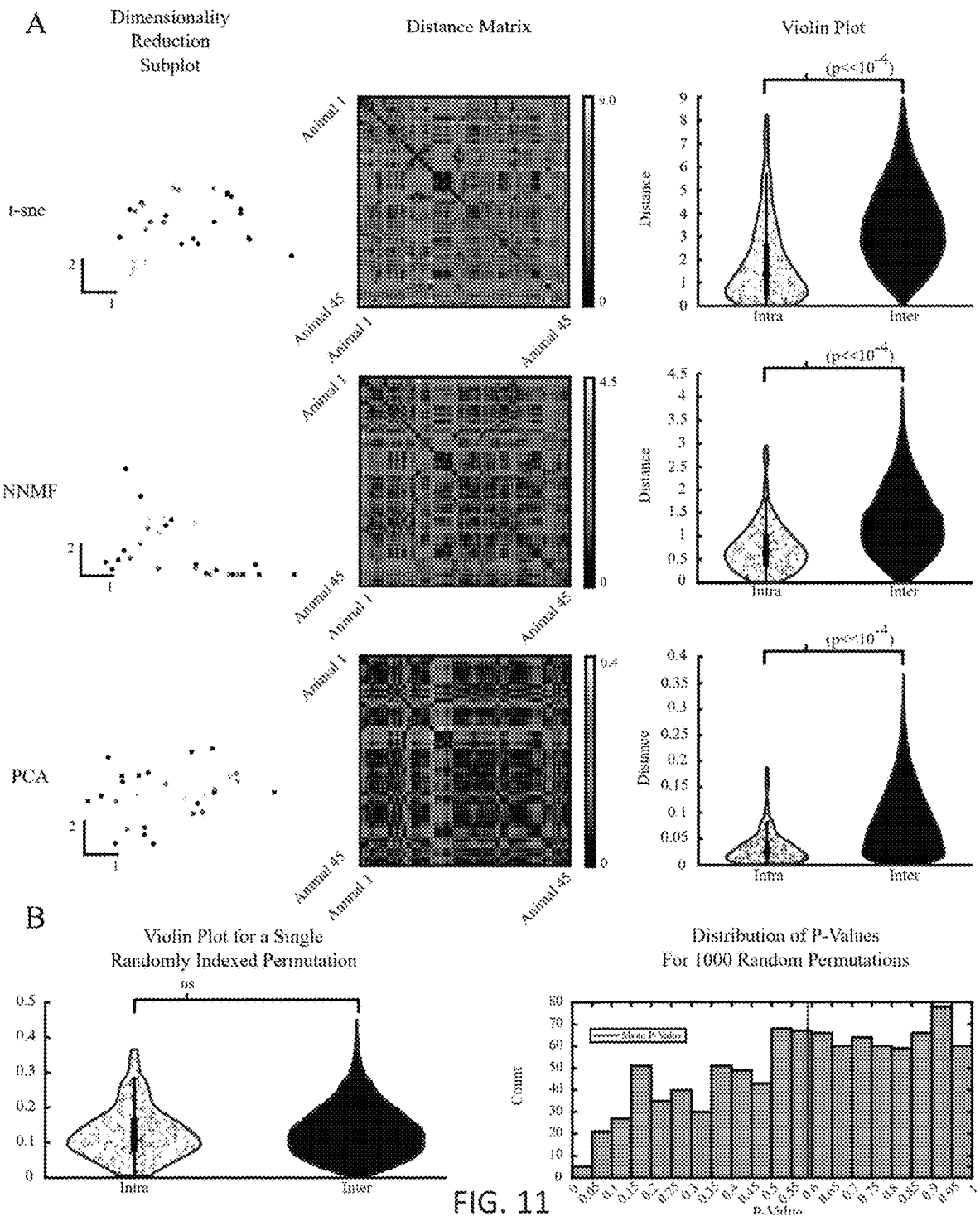

FIG. 11 illustrates multiple dimensional reduction techniques reveal individual specific signatures within the Markovian neural barcode. (A) The Markovian neural barcode identifies animal specific signatures using alternative dimension reduction techniques. Specifically, alternative techniques were applied, namely t-Distributed Stochastic Neighbor Embedding (t-sne), Nonnegative Matrix Factorization (NNMF), and Principal Component Analysis (PCA) to the Markovian neural barcodes represented in FIG. 6. For illustrative purposes, four recordings from seven animals are plotted on the first two dimensions and reveal clustering. The 180 recordings from 45 animals are illustrated within a distance matrix, revealing a block structure according to individual mice. This is further quantified by the intra/inter distance violin plot (with Wilcoxon Rank Sum Test), demonstrating that the Markovian neural barcode identifies animal specific dynamical signatures that are reproducible and specific. (B) the rolls of the PC data matrix were randomly permutated and calculated the statistical significance of the corresponding intra/inter distance with each permutation. A histogram of these P-values was plotted, and a violin plot from a single trial of these permutations. For 1000 permutations, the mean P-value across the 1000 test was 0.58 and only 5 permutations crosses a liberal statistical threshold of $p<0.05$.

Figure 12:
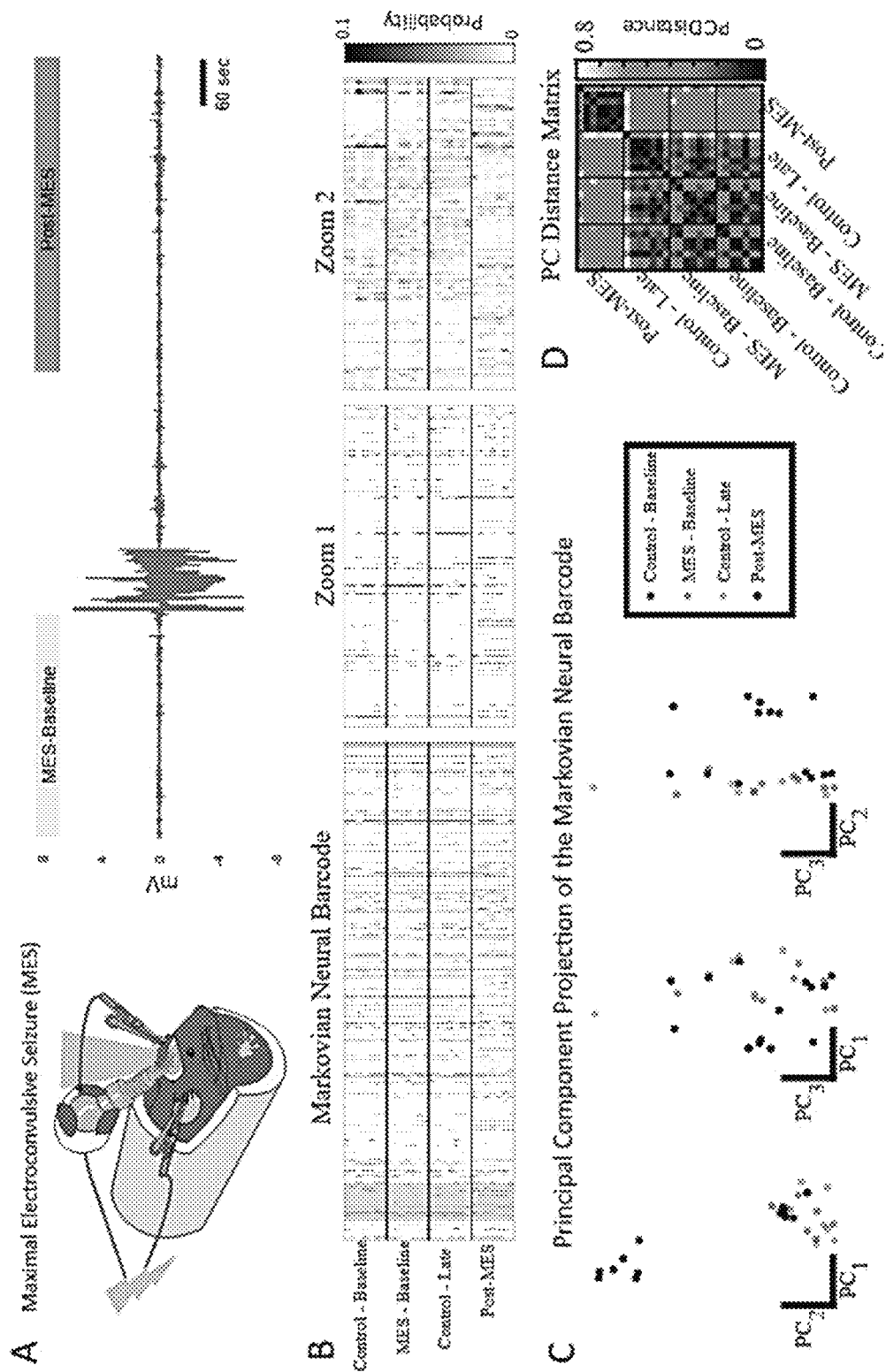
Figure 12:
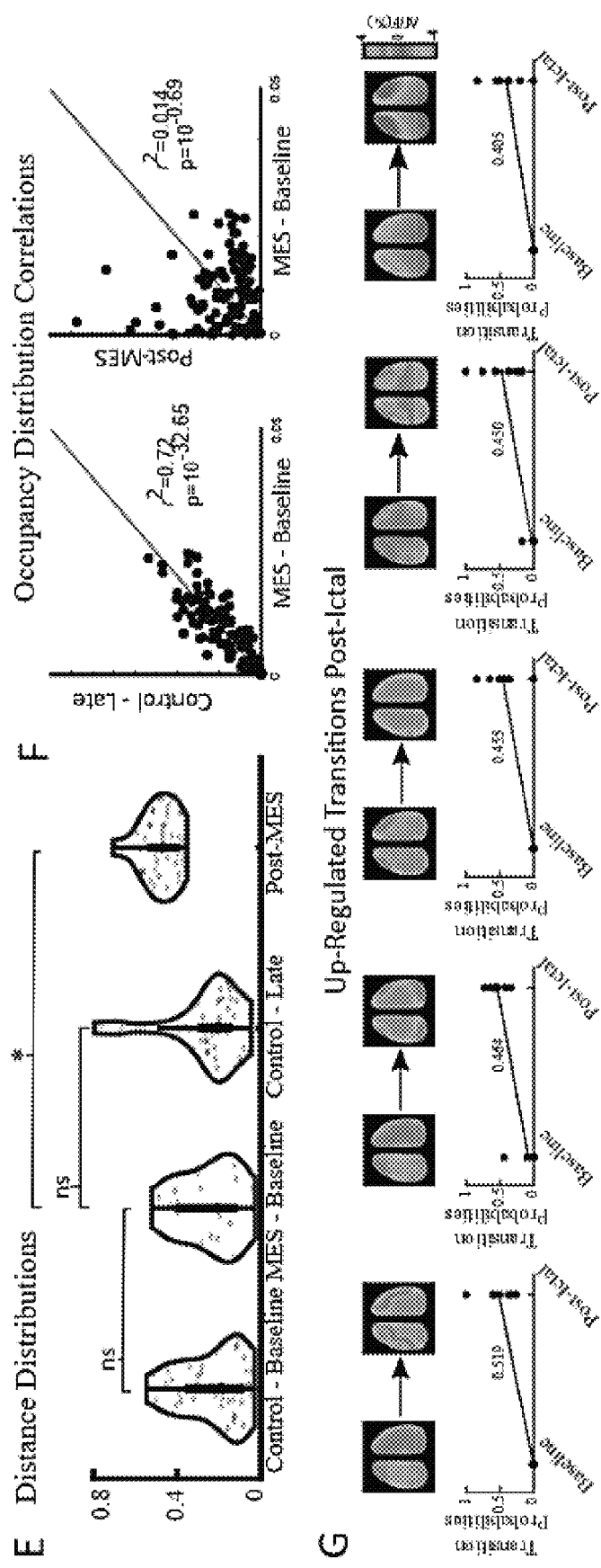

FIG. 12 illustrates The Markovian neural barcode reveals changes to mesoscale 'grammar' after extreme excitation. (A) A schematic representation of the integration of the Maximal Electroconvulsive Seizure model and mesoscale cortical imaging in the awake mouse. The trace represents an electrographic illustration of cortical activity preceding the induction of a seizure with MES, during the seizure, and following termination of the seizure. The epochs of mesoscale activity used to construct the Markovian neural bar code are highlighted. Note, the post-MES epoch does include the period immediately following seizure termination as this is characterized by post-ictal activity suppression. (B) The Markovian neural barcode and associated zoomed in views is presented for four conditions: a control condition divided into early and late epochs, and MES recordings divided into baseline and post-MES epochs. (C) Principal component dimension reduction of the Markovian neural barcode reveals clustering of post-MES epochs. (D) A principal component distance matrix illustrates the similarities between control and baseline-MES conditions and the distinct change in the Markovian neural barcode after MES. (E) Violin plots illustrate the statistical quantification of principal component distance. (F) Scatter plots illustrate the absence of any correlation between Markov Element occupancy in the occupancy distribution in the baseline-MES condition and post-MES condition, and conserved occupancy distributions between the baseline-MES and control conditions. (G) The top five most upregulated transitions post-MES are illustrated.

Figure 13:
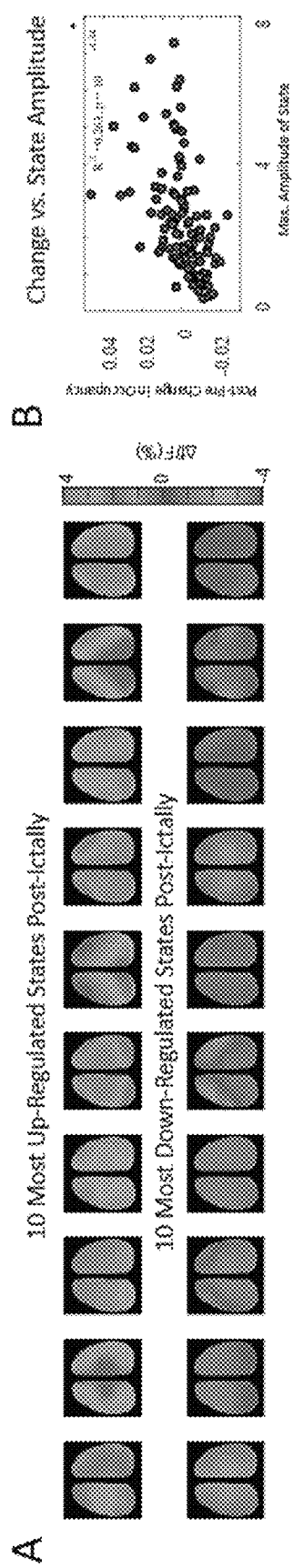

FIG. 13 illustrates changes to the distribution of Markov Elements after MES. (A) The 10 most up-regulated and down regulated Markov Elements after MES. The most up-regulated Markov Elements, in general, correspond to Elements with more extreme average fluorescence amplitudes. (B) Change in a Markov Element's representation within the occupancy distribution, as number of frames, was linearly related to the maximum fluorescence amplitude of the Markov Element.

Figure 14:
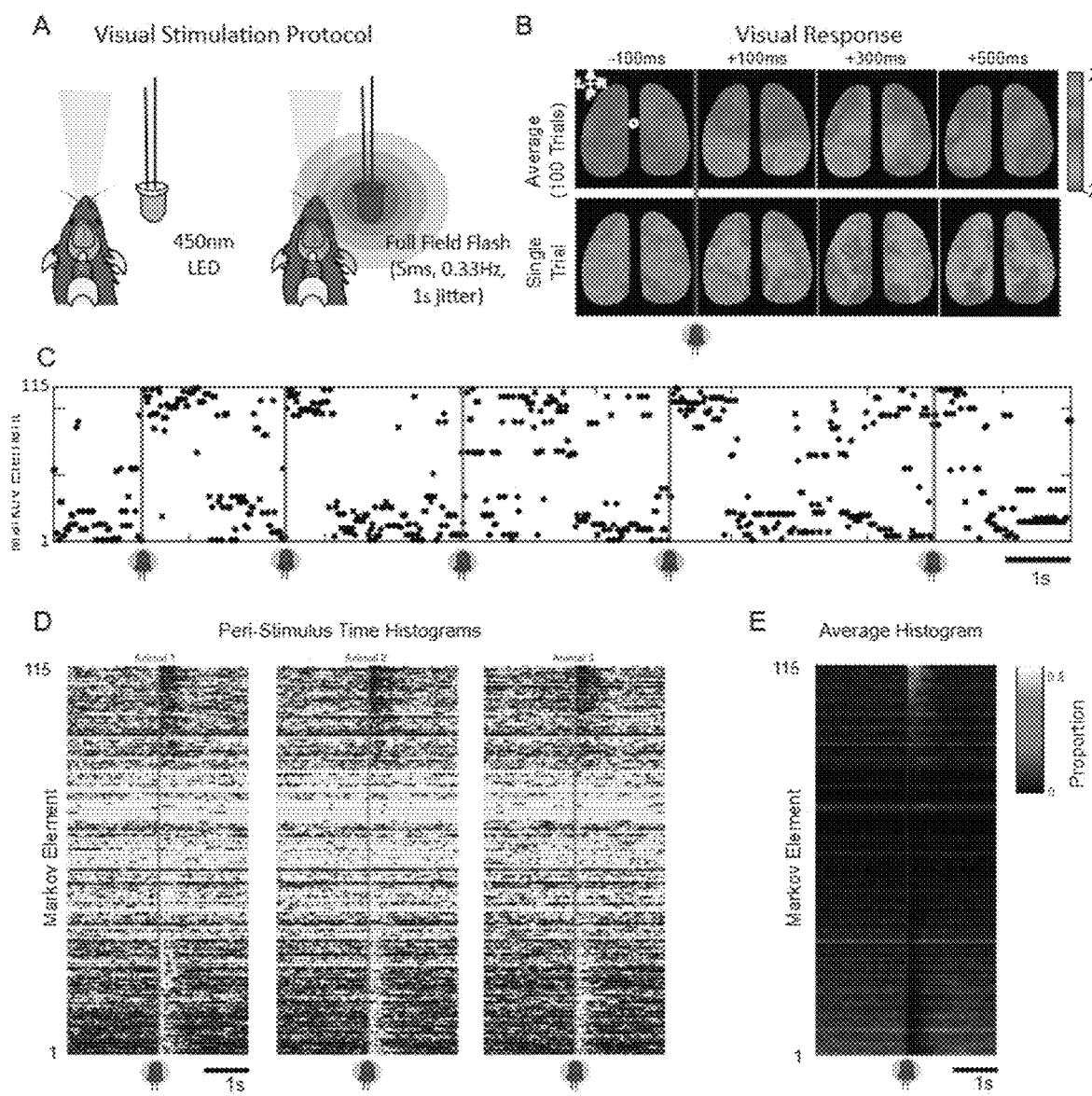
Figure 14:
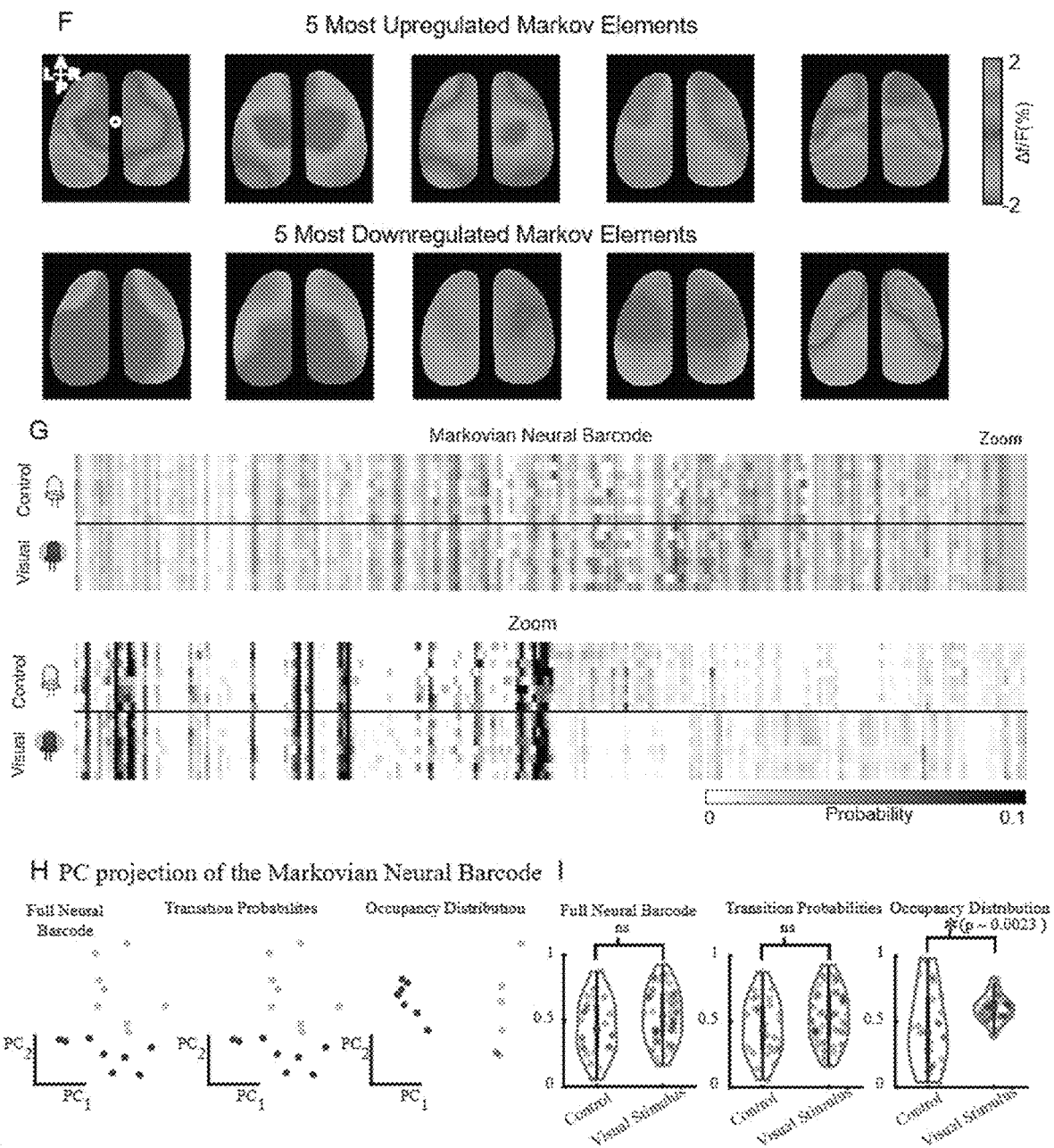

FIG. 14 illustrates sensory processing introduces activity and changes activity without changing 'grammar'. (A) A schematic representation of the visual stimulation protocol during mesoscale calcium imaging is illustrated. (B) Montages of the visual response are illustrated, first for the average of 100 trials, and then for a single trial. Note that for the single trial calcium activity in visual cortex overlies internally generated dynamics. (C) A raster plot illustrates Markov Elements representation for each frame flanking visual stimuli. (D) Representative histograms for three mice are illustrated sorted according to the Markov Elements most upregulated by visual stimuli. (E) The average histogram for n=8 animals is illustrated. (F) The five most upregulated and five most downregulated Markov Elements by visual stimuli are illustrated. (G) The Markovian neural barcode is illustrated for n=8 mice for mesoscale cortical imaging acquired without a visual stimulus, and as animals received visual stimuli. (H) Principal component dimension reduction of the Markovian neural barcode does not reveal changes to the overall barcode or transition probability matrix, but reveals separation of the occupancy distribution. (I) Violin plots illustrate the statistical quantification of the principal component distance between visual and control conditions reveals that only the occupancy distributions are altered by visual stimulation.

Figure 15:
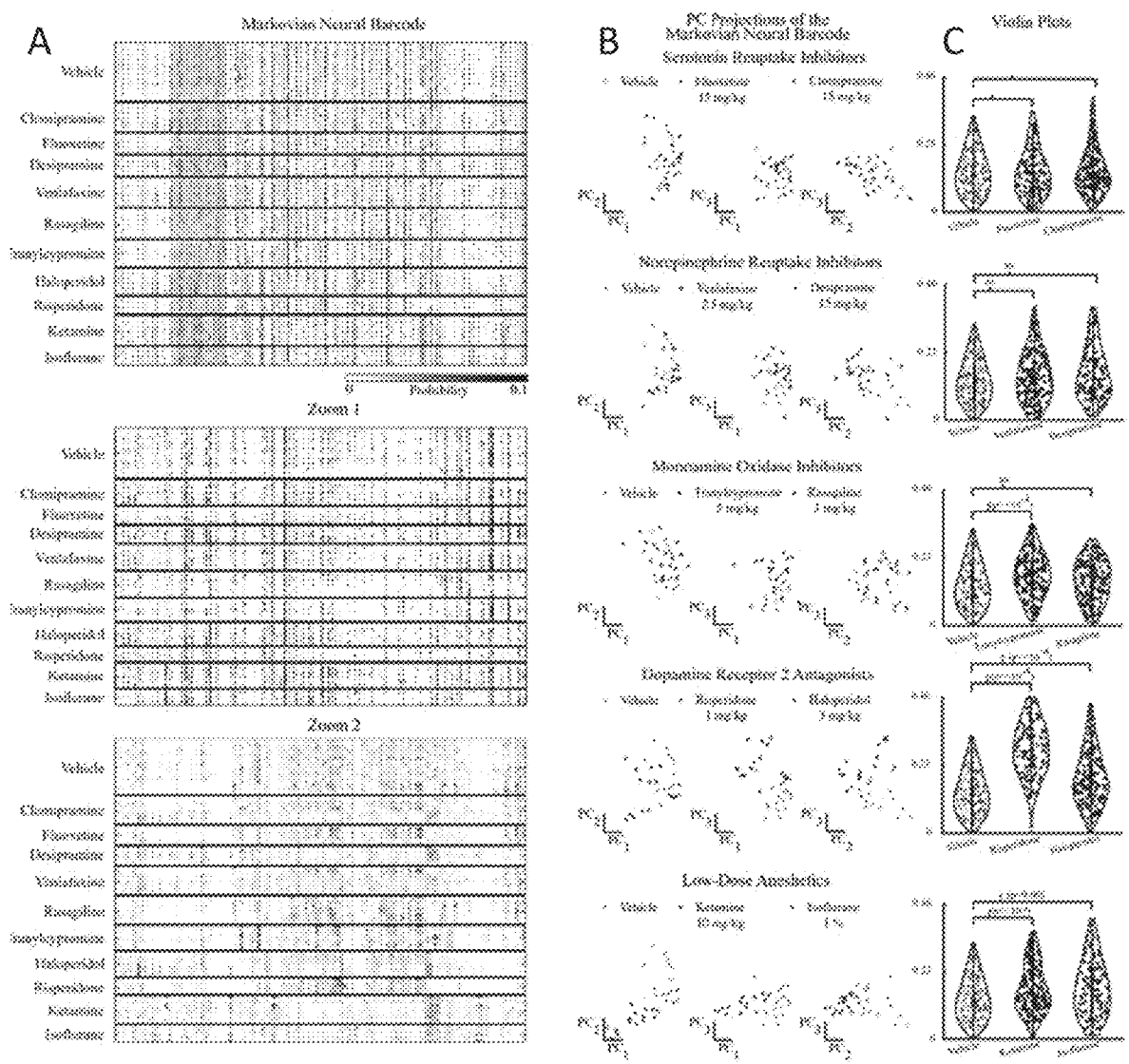
Figure 15:
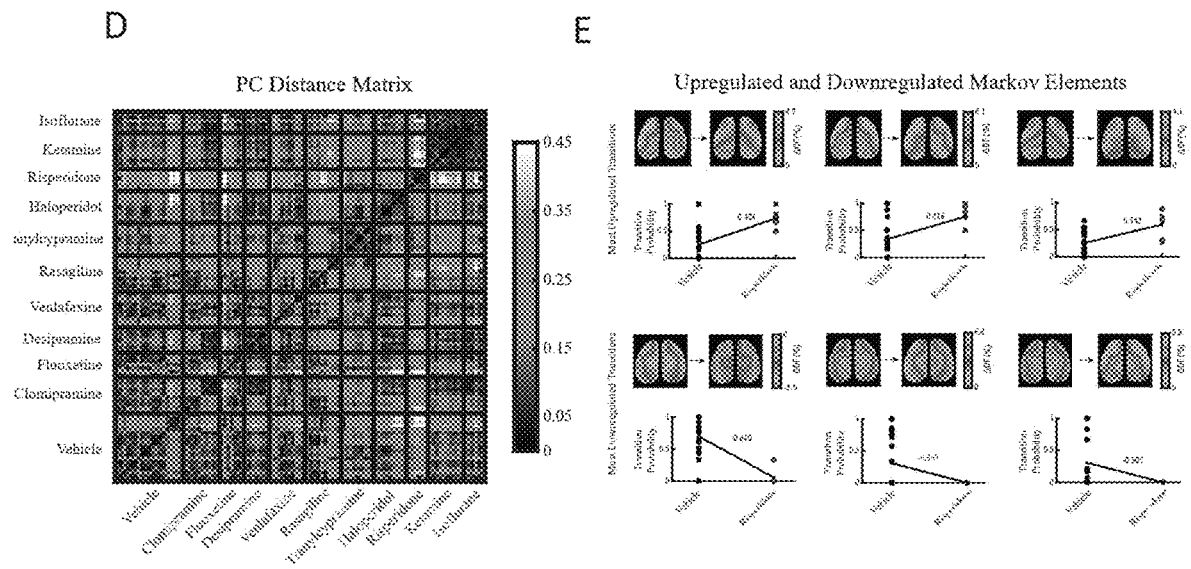

FIG. 15 illustrates pharmacologically generated diversity in Markovian neural barcode. (A) The Markovian neural barcode for a vehicle and ten drug conditions is represented. The conserved structure is evident, as are drug and class-specific effects. (B) Principal component dimension reduction of the Markovian neural barcode reveals drug class differences and differences between drugs within a class. (C) Violin plots illustrate the statistical quantification of drugs' effects on the Markovian neural barcode. (D) The principal component distance matrix reveals a block structure, with commonalities and differences in pharmacological effects on the Markovian neural barcode. (E) To illustrate the pharmacological diversity generated, the three most upregulated and downregulated Markov Element transitions are represented for the risperidone condition.

Figure 16:
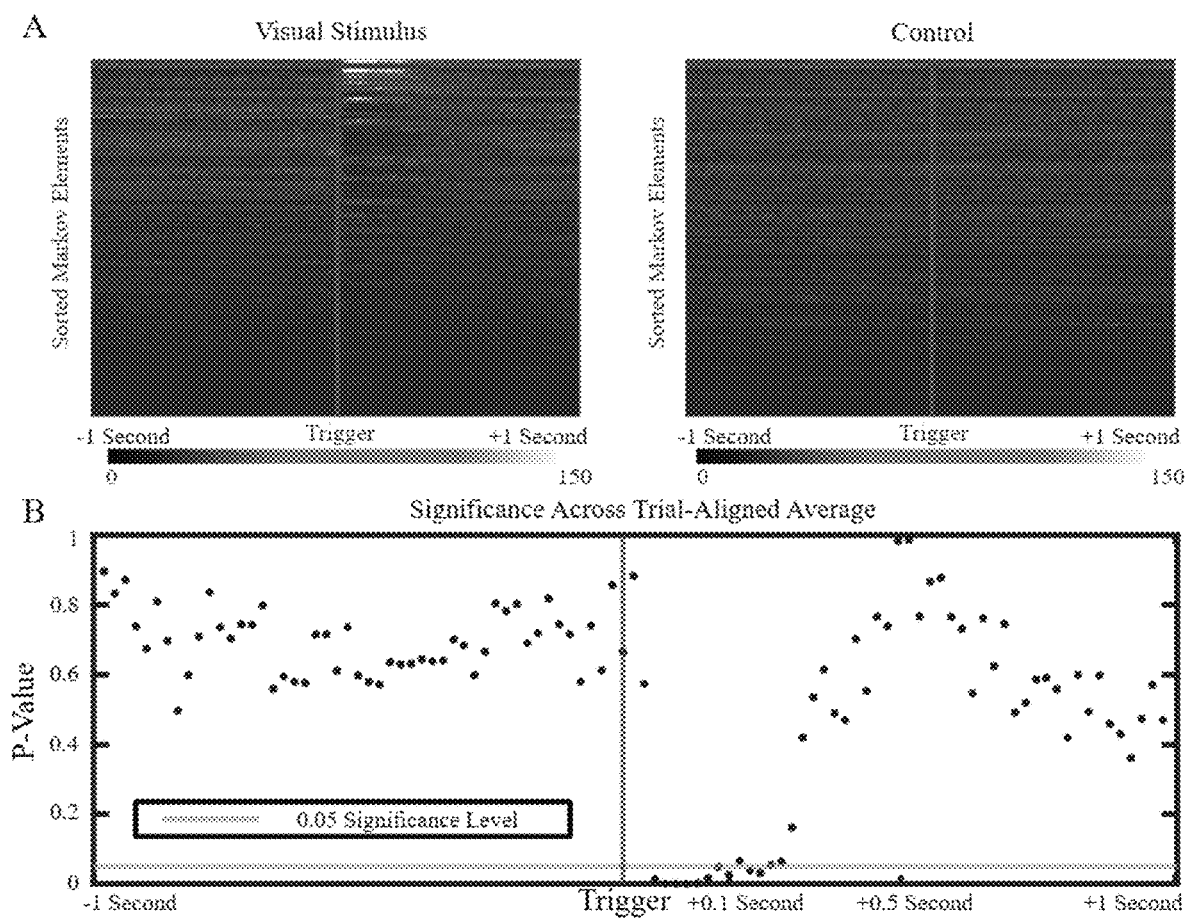
Figure 16:
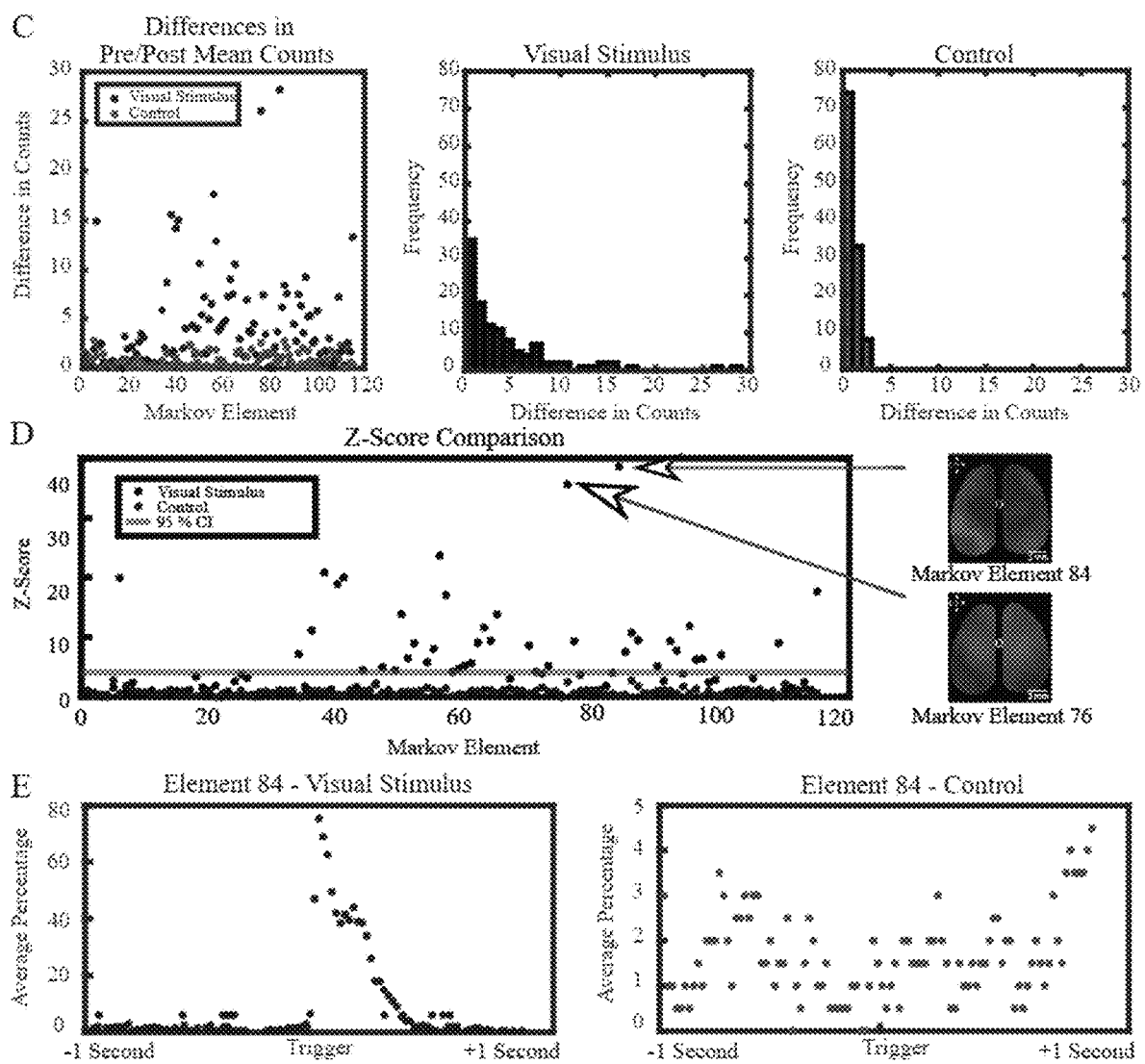

FIG. 16 illustrates visual stimulation during quiet wakefulness. (A) A sliding window representation of the occupancy distribution (counts) of Markov Elements ranked according to pre-stimulus frequencies. (B) The difference in mean counts pre/post visual stimulus trigger across Markov Elements. Here, counts are quantified as the occurrence of a Markov Element in the Markov model for frames preceding and following 200 visual stimuli in a particular recording is shown. The mean count for a Markov Element at a given time is the mean of the counts taken over all recordings. (C) The occurrence of Markov Elements after the delivery of the visual stimulus is normalized to control recordings, revealing several upregulated Markov Elements following a full field monocular stimulus. Two of the most upregulated Markov Elements are illustrated, characterized by a calcium signal within primary and secondary visual cortex. Images of the elements with the most significant z-scores are provided. Note that these Markov Elements correspond to states with activity indicative of the occipital lobe. (D) The occurrence of the exemplar Markov Element upregulated by visual stimulation in relation to visual stimulation. The average occurrence of the Markov Element is illustrated for frames preceding and following 200 visual stimuli. (E) details results of visual stimulus and control for Element 84.

Figure 17:
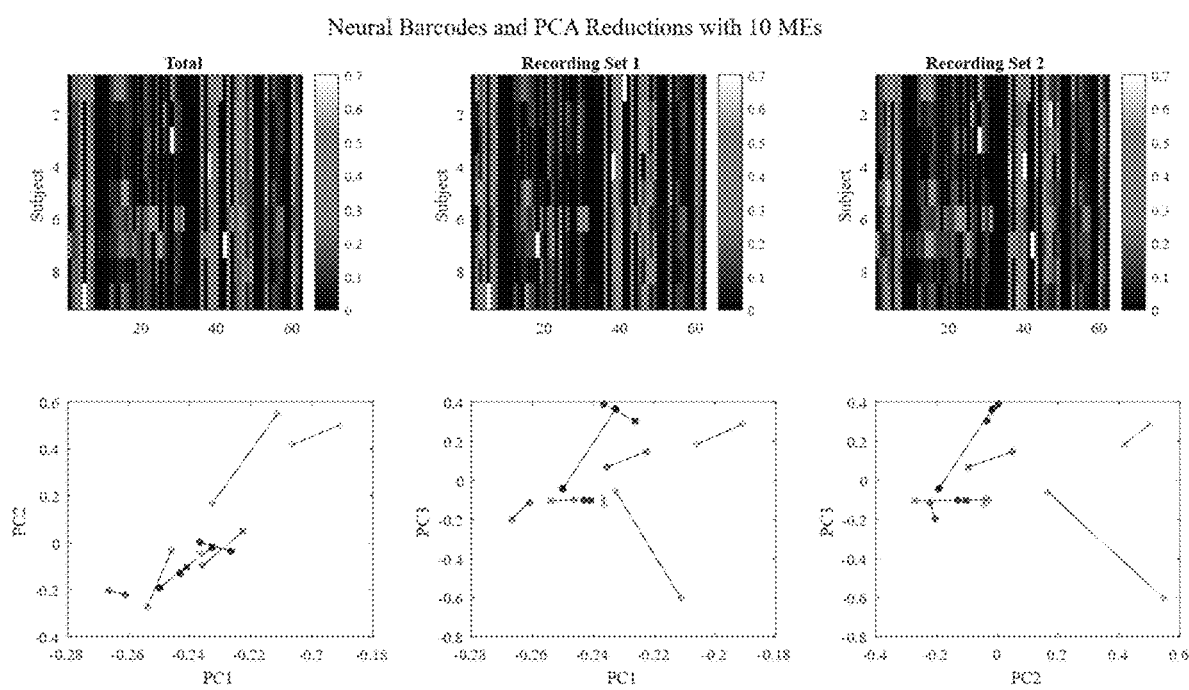

FIG. 17 (Top) The computed neural barcodes for 9 individuals from the midnight-scan club data taken for the full data set (left), the first half (middle), and the second half (right). A total of 10, randomly selected Markov-Elements were used. (Bottom) The principal component analysis projections in the neural barcode recordings for PC1 vs PC2 (left), PC1 vs PC3 (middle), and PC2 vs PC3 (right).

Figure 18:
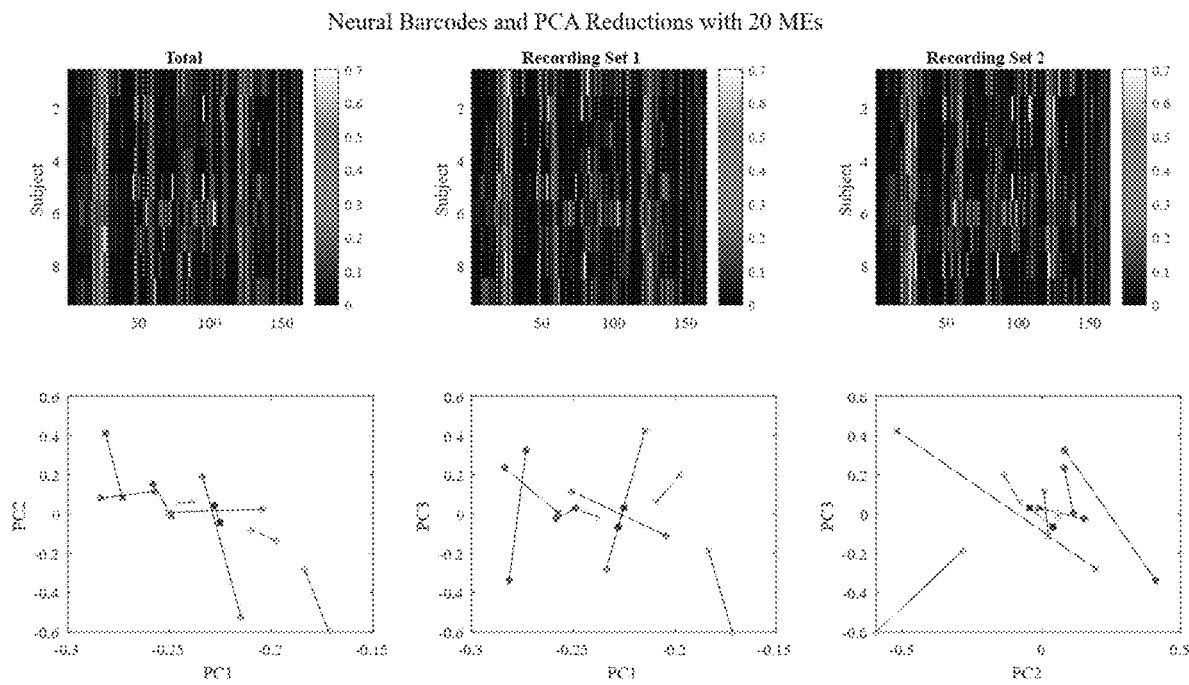

FIG. 18 (Top) The computed neural barcodes for 9 individuals from the midnight-scan club data taken for the full data set (left), the first half (middle), and the second half (right). A total of 20, randomly selected Markov-Elements were used. (Bottom) The principal component analysis projections in the neural barcode recordings for PC1 vs PC2 (left), PC1 vs PC3 (middle), and PC2 vs PC3 (right).

Figure 19:
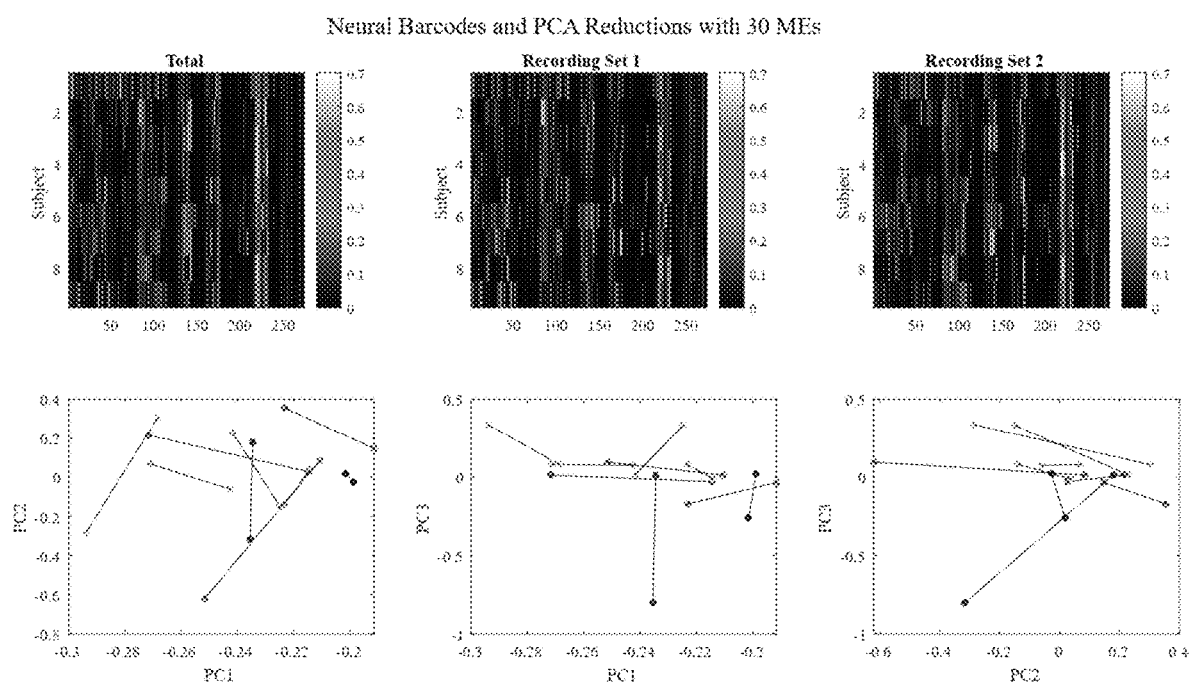

FIG. 19 (Top) The computed neural barcodes for 9 individuals from the midnight-scan club data taken for the full data set (left), the first half (middle), and the second half (right). A total of 30, randomly selected Markov-Elements were used. (Bottom) The principal component analysis projections in the neural barcode recordings for PC1 vs PC2 (left), PC1 vs PC3 (middle), and PC2 vs PC3 (right).

Figure 20:
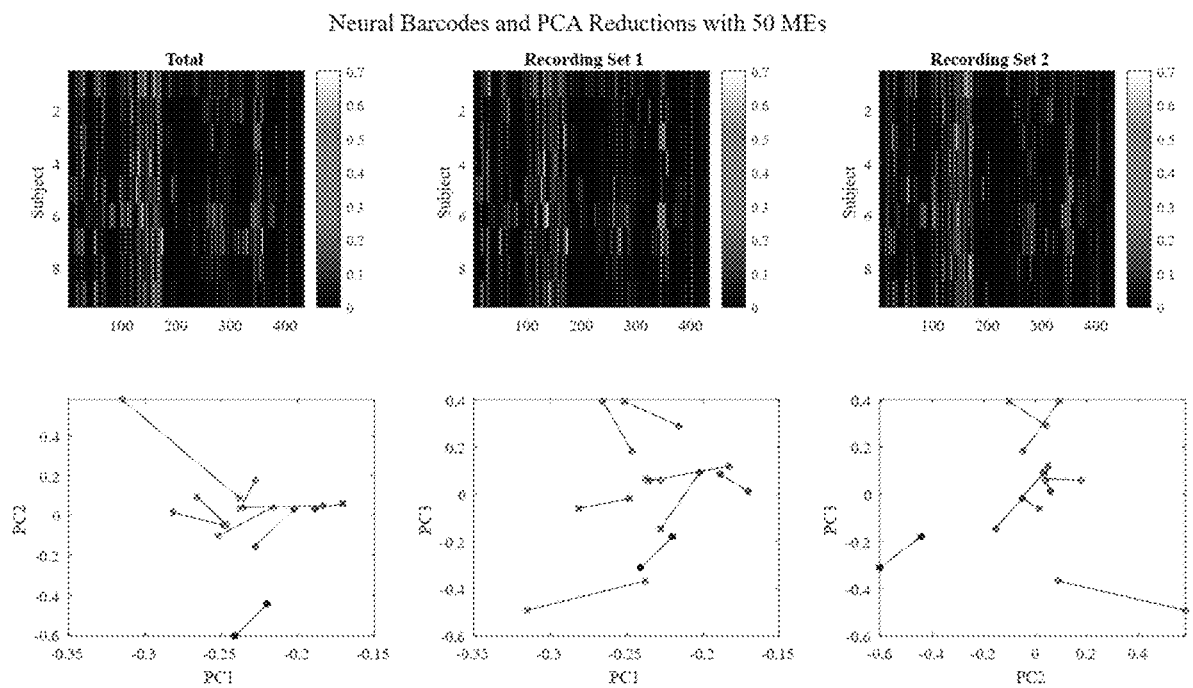

FIG. 20 (Top) The computed neural barcodes for 9 individuals from the midnight-scan club data taken for the full data set (left), the first half (middle), and the second half (right). A total of 50, randomly selected Markov-Elements were used. Similar patterns from the individuals in the first half persist re-occur in the second half of the recordings, suggesting a neural barcode is useful in establishing a baseline dynamics in individuals, and potentially in detecting changes due to pathology. (Bottom) The principal component analysis projections in the neural barcode recordings for PC1 vs PC2 (left), PC1 vs PC3 (middle), and PC2 vs PC3 (right).

DETAILED DESCRIPTION OF THE INVENTION

The methods of the invention comprise recording mesoscale spatiotemporal data from a subject's brain. As used herein the term "subject" generally refers to an animal, such as a mammalian species (e.g., primate including humans) or avian (e.g., bird) species or reptilian species. Mammalian subjects include mouse, rat. a primate, a simian, a human, a dog, or a cat. Animals may include, but are not limited to, farm animals, sport animals, and pets. A subject can be a healthy or asymptomatic individual, an individual that has or is suspected of having a disease (e.g., a neurological disorder) or a pre-disposition to the disease, or an individual that is in need of therapy or suspected of needing therapy. In some embodiments, the subject is a patient.

The invention provides methods of generating, visualizing and comparing Markovian neural barcodes. The neural barcodes represent mesoscale cortical spatiotemporal dynamics. The invention uses a Continuous Time Markov Chain (CTMC) model[22] to extract the temporal structure of mesoscale cortical activity motifs with a generalizable set of Elements. These elements describe discrete neocortical activity motifs, the probabilistic sequence of which reveals a common 'grammar' to neocortical dynamics. This grammar can be visualized as a Markovian neural barcode, allowing for the differences and similarities in mesoscale activity dynamics to be readily apparent. These neural barcodes allow for the comparison of cortical spatiotemporal dynamics between individuals and/or overtime wherein differences may be indicative of biological changes.

The invention further provides methods for analyzing biological or pathological changes in cortical spatiotemporal dynamics by transforming mesoscale spatiotemporal data to Markovian neural barcodes. In particular, the methods of the invention provide a compact representation of cortical spatiotemporal dynamics, thereby avoiding the conventional 'big-data' problem of mesoscale raw recordings such that a comparison between recordings can be made.

Spatiotemporal data including mesoscale, whole brain or data covering multiple areas of the brain may be obtained by methods known in the art that use genetically encoded neural activity indicators, organic dyes, transgenic mice, fMRI (functional magnetic resonance imaging), EEG, (electroencepholograph), electrocorticography (ECOG) intracranial EEG, magnetoencephalography (MEG), data obtained using implanted electrodes (e.g. neuropixels probes) or any other measure of neural activity.

Figure 1:
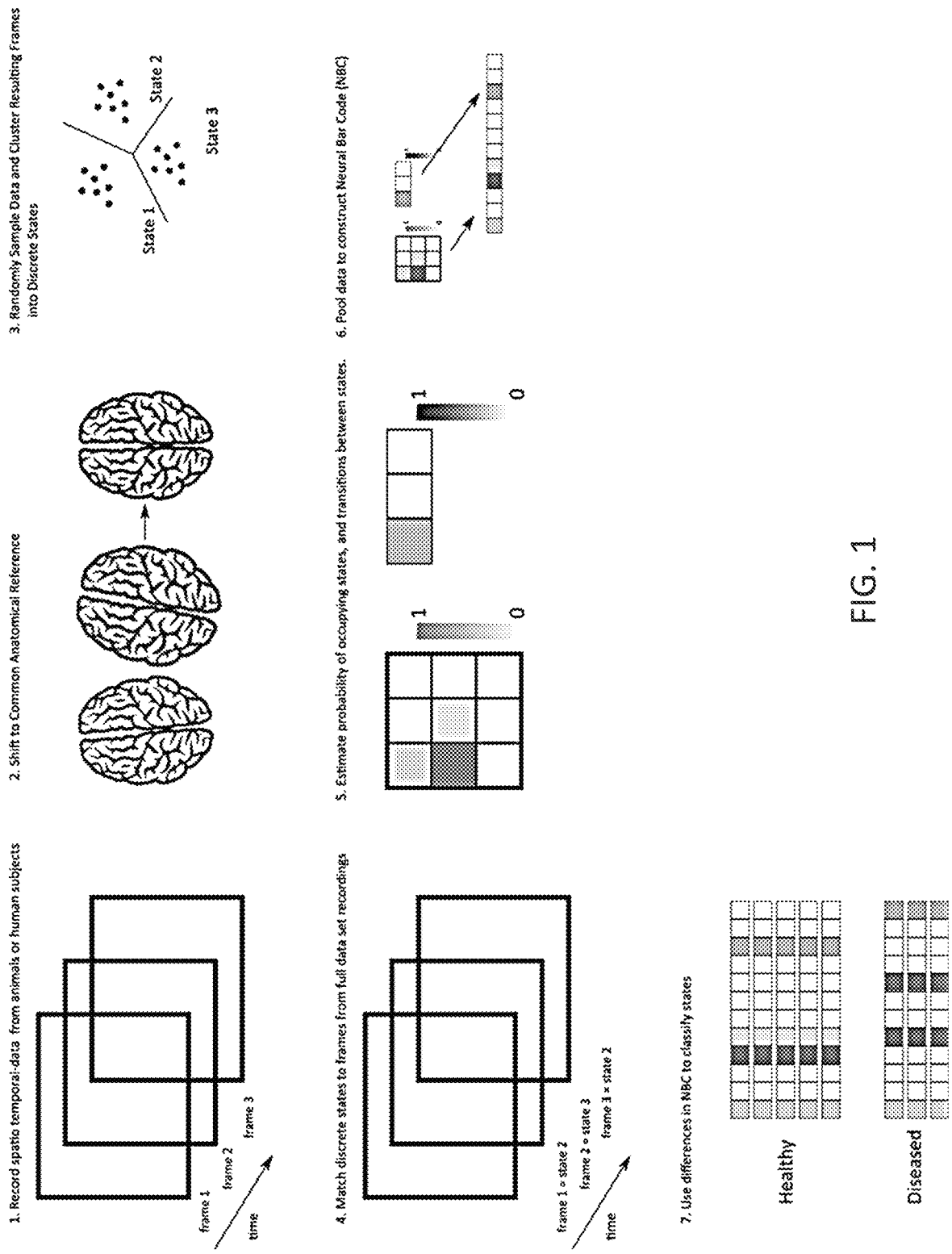
FIG. 1 is a schematic detailing the generation of a neural barcode from a recording of spatiotemporal data of a subject's brain.

Referring to FIG. 1, the raw spatiotemporal data recordings are stacked and registered to a predetermined anatomical reference to obtain registered spatiotemporal data recordings thereby allowing for a direct comparison of individual recordings. In some embodiments, the anatomical reference is the Allen Institute Brain Atlas. In other embodiments, it is the Montreal Neurological Institute atlas or Talairach Atlas. In other embodiments, it is the 10-20 electroencephalography system. Optionally, each image stack is aligned to the predetermined anatomical reference by a common coordinate framework (CCF) using rigid transformation to anatomical landmarks. A state-space discretization approach is applied to the data to cluster the frames in discrete states, each defined by a predefined central Markov Element. The frames from the full data recordings are matched to the discrete states. The probability of occupying a state and the transition between the states is estimated. The data is pooled to construct the neural barcode.

Sampling the Initial Discrete Markov States

To construct a global Markov Element set for a specific type of animal or human, a pre-determined number of frames are randomly sampled (optionally 20, 25, 30, 35, 50 or more frames) from a pre-determined number of recordings (less than 500, at least 500, at least 750, at least 850, at least 900, at least 950 or 1000 or more recordings) across a variety of conditions including drug, acute chronic stress, acute stress, control, and visual stimulus conditions. The sampled frames are stored into a single data matrix. A global mask was then applied to each frame in this data matrix and a K-Means clustering algorithm or semi-binary non-negative negative matrix factorization is used with a choice of between 100-200, optionally 200 clustering centroids. Optionally, manually curated the Markov Elements to remove Elements typified by artifacts, including blood vessel prominence at the conclusion of bouts of movement, shadows in the imaging field, and window imperfections and functionally duplicative Markov Elements to obtain a final basis set of global Markov Elements (denoted at B) having x individual Markov Elements. In some embodiments, there is between 1 to over 5,000 individual Markov Elements. In some embodiments, there is 115 individual Markov Elements.

Constructing the Markov Chain Model

The global Markov Element set is denoted as B. The number of individual Markov Elements denoted as X. To construct a Markov chain model, M, for a given recording, R, with $n_f$ frames, each data frame, $R_i$, $i \in [1, 2, \ldots, n_f]$, is paired with a corresponding global Markov Element, $B_k$, $k \in [1, 2, \ldots, x,]$, by finding the index k that solves $$\min_k \sum_{j=1}^{256 \times 256} ((R_i)_j - (B_k)_j)^2$$

The index, $\hat{k}$, that minimizes the sum of squares difference above, is the assigned Markov element, $M_i = \hat{k}$, for frame $R_i$ of R.

Estimating Transition Probability Matrices And Occupancy Distributions

The Markov chain model provides an unconditional description of cortical activity states through proportional distribution of Markov Elements during a given epoch of cortical activity as provided by the occupancy distribution. Here, a consistent estimator of the occupancy distribution is given from the distribution of observed frequencies in the Markov chain. The unconditional probability for the $i^{th}$ state is given by $$p_i = p(m_i) = \frac{N(m_i)}{\sum_i N(m_i)}$$

where $m_i$ is the $i^{th}$ element in the x element state space, and N(X) counts the occurrence, or frequency, of element X in the chain model. In the construction of the occupancy distribution, contiguous frames that occupy the same Markov Element, so called self-transitions, are considered.

From the Markov chain mode, the conditional probabilities for the corresponding transition probability matrix, P, are derived by the maximum likelihood estimates[38].

$$P_{ij} = p(m_j m_i) = \frac{N(m_i m_j)}{N(m_i)}, i, j = [1, 2, \ldots, x]$$

In the case where state $m_i$ does not occur in the chain, it is assumed that $p_{ij}=0$, $j \in [1, \ldots, x]$. Optionally, the transition probability matrix is computed without self-transition.

Neural Barcode Construction

To construct a neural barcode the transition probability matrix was unwrapped, x×x, for each recording into a vector, 1×x², and concatenating it's associated occupancy distribution, 1×x. Thus for an analysis with k recordings, where x is 115, the corresponding neural barcode is of size k×(115²+ 115)=k×13,340. For computational and visual convenience, recordings representing a common condition are grouped together in the corresponding neural barcode. For plotting clarity, columns of the neural barcode with all 0 entries, corresponding to transitions that never occurred, may be removed.

In some embodiments, the noise is removed from the neural barcode. Noise in the neural barcode is either fixed in time, due to individual heterogeneity and represents normal deviations between individuals or represents a sampling error in estimating occupancy or transition probabilities.

Noise resulting from heterogeneity is identified and optionally removed by elements from the neural barcode that have been identified by repeatedly sampling over periods of time neural recordings from multiple individuals as being highly heterogeneous.

Noise resulting sampling error is reduced by setting the minimum recording time to a length greater that the time required for the neural barcode vector to converge.

Determining a Normative Barcode

Optionally, in some embodiments, a standard barcode is determined. To generate a standard barcode reflective of a normative or non-disease/non-pathological state, repeated measurements of the neural barcode from a large group of individuals classified as in the normative or non-disease state are obtained. The plurality of normative or non-pathological state neural barcodes are used in a comparison distribution.

Comparing Neural Barcodes

Optional neural barcodes can be compared. In some embodiments, neural barcodes of an individual are compared to a baseline or normative barcode to identify differences in the test individual's barcode.

To conduct the comparison, a single recording is obtained from an individual. The distance between the vectors for the normative barcode distribution and the test individual are optionally transformed into a z-score, or other statistical distance metric. If the probability that the individual's neural barcode is generated from the sampled distribution of normal individuals is high, the test individual's neural barcode is classified as a "normal" barcode. If the probability that the individual's neural barcode is generated from the sample distribution of normal individuals is low, the text individual's neural barcode is classified as aberrant.

Alternatively, in some embodiments, an individual's neural barcode is compared to one or more earlier neural barcodes such that changes are tracked overtime. Changes overtime may be indicative of changes in disease state.

Optionally, multiple recordings from a defined time period for a single individual can be combined to form a baseline neural barcode. In particular, in some embodiments, subtle, long-term changes to brain dynamics of an individual are assessed by repeated recordings. The same set of discrete states that define Markov Elements are used to analyze all recordings and define cross-comparable neural barcodes from different recording times. Optionally, the recordings can be days, weeks, months apart. In some embodiments, sets of recordings are compared, wherein each set includes a plurality of recordings taken with a short time frame, optionally hours or days apart. The subsequent sets of recording are taken under comparable conditions and timing to the first set. The neural barcode determined from the first set of recordings is used as baseline to determine long term changes.

In some embodiments, neural barcodes are compared using an intra-inter group analysis.

For intra-inter group analysis, principal component analysis is first applied to the relevant neural barcode with columns of zero mean removed, and the first five principal components for each recording are stored in a new reduced coefficient matrix. A pairwise distance matrix, say M, is then calculated from the rows of the previous reduced principal component matrix using the Euclidean norm.

To quantify the separation in principal component space between a baseline group, $G_B$, and condition group, $G_C$, the corresponding intra-inter group distances is found from M. If the rows of M that correspond to the baseline recordings are $b_1, b_2, \ldots, b_n$ then the intra-group distances are the collection of values defined by $M(b_i, b_j)$ for i, j=1, 2, \ldots, n, where repeats ($M(b_i, b_j)=M(b_j, b_i)$) were ignored, and self comparisons ($M(b_i, b_i)$). If $c_1, c_2, \ldots, c_m$ are the rows of M corresponding to the recordings of our condition group, then the inter-group distances are the collection of values defined by $M(b_i, c_j)$ for i=1, 2, \ldots, n and j=1, 2, \ldots, m, where again repeats were ignored, self comparisons, and also intra-condition values ($M(c_j, c_k)$, j, k=1, 2, \ldots, m).

Calculating Most Up/Down Regulated States

To calculate the most up- and down-regulated state transitions between baseline and condition recordings, the matrix of unwrapped transition probability matrices, where x is 115 ($k \times 115^2$) for k recordings, were first organized by condition into sub-matrices, M, $G_{C_1}, \ldots, G_{C_s}$ for s conditions, where the column means, say m, $g_1, \ldots, g_s$, of size $1 \times 115^2$, were then calculated across each sub-matrix. Mean differences vectors, $v_i = m - g_i$, $i = 1, \ldots, s$, were then computed across all conditions. These difference vectors, $v_i$, can then be sorted in ascending/descending order to find the most up/down regulated state transitions indices. These indices can be decomposed into their corresponding row/column in their associated $115 \times 115$ transition probability matrix, in which, the associated global basis Elements describing that transition can then be found.

In some embodiments, changes in brain transition between different discrete states and up-regulation or down-regulation of specific states is used to monitor disease progression wherein changes in up-regulation or down-regulation of specific states or changes in how a neural barcode responds to stimuli are used to monitor a change in disease condition.

In alternative embodiments, where a neural barcode has been determined to be indicative of a specific disease state by finding limited variability in repeated measurements of the neural barcode from a large group of individuals classified as having a specific condition. The disease specific neural barcode standard is optionally used as a diagnostic indicator wherein an individual's neural barcode is compared to one or more disease specific neural barcodes.

In some embodiments, changes in neural barcodes are used to forecast possible disease states.

Embodiments of the present invention may be provided as a computer program product, which may include a machine-readable storage medium tangibly embodying thereon instructions, which may be used to program a computer (or other electronic devices) to perform a process.

In one embodiment, the computer program product may comprise a computer readable memory storing computer executable instructions thereon that when executed by a computer generate a baseline or representative neural barcode from a plurality of mesoscale spatiotemporal data in accordance with the methods of the invention.

In other embodiments, the computer program product may comprise a computer readable memory storing computer executable instructions thereon that when executed by a computer generate a neural barcode from mesoscale spatiotemporal data in accordance with the methods of the invention.

In other embodiments, the computer program product may comprise a computer readable memory storing computer executable instructions thereon that when executed by a computer compare two or more neural barcodes in accordance with the methods of the invention.

The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

To gain a better understanding of the invention described herein, the following examples are set forth. It should be understood that these examples are for illustrative purposes only. Therefore, they should not limit the scope of this invention in any way.

Example 1: Mesoscale Imaging Reveals a Markovian 'Grammar' of Brain Dynamics

Figure 2:
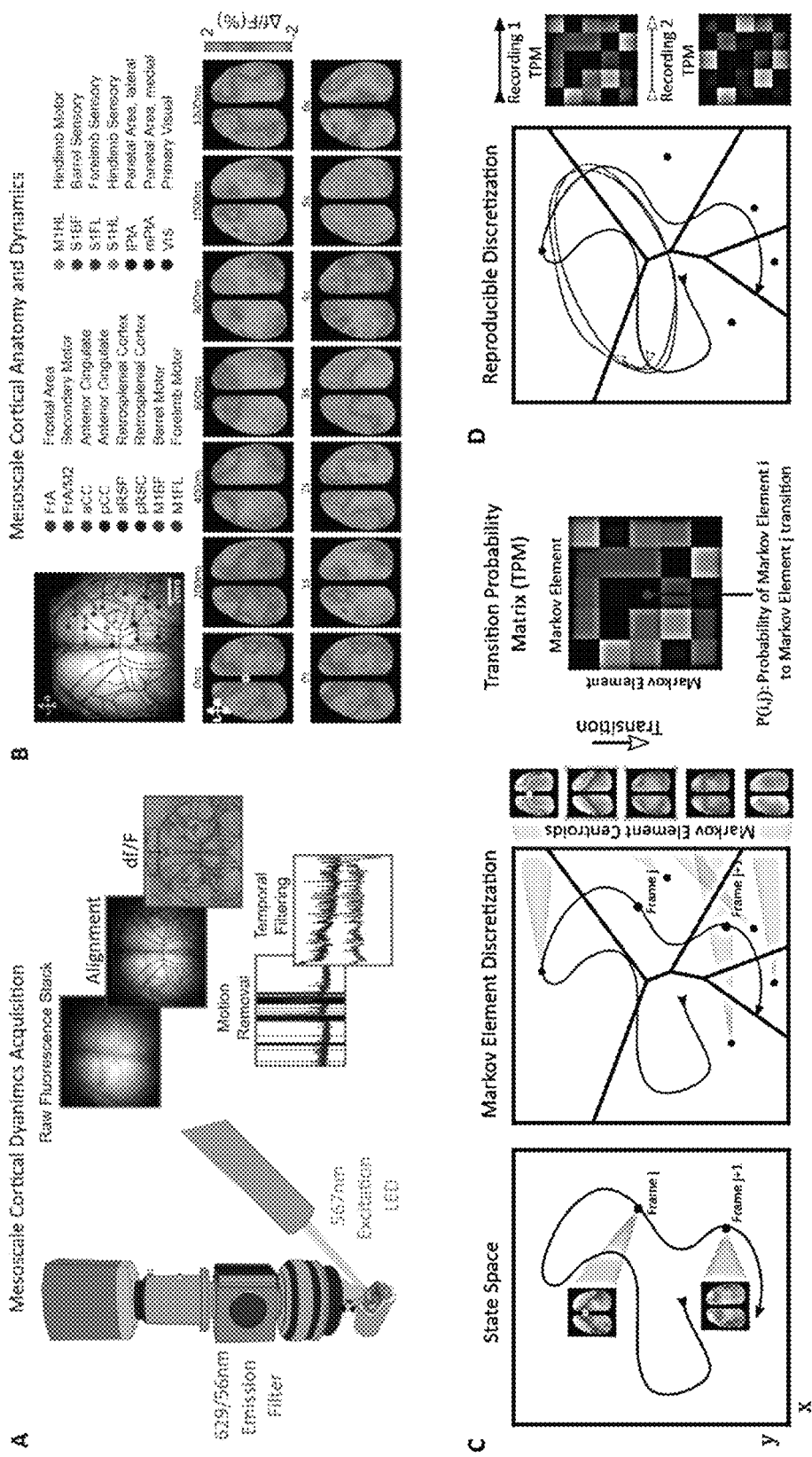
FIG. 2 illustrates Markovian dynamics in mesoscale cortical calcium activity. (A) A schematic representation of mesoscale calcium activity acquisition and pre-processing of the recordings. (B) A representative mesoscale fluorescence image that has been aligned to the Allen Institute for Brain Science atlas and the legend illustrates cortical regions captured by mesoscale calcium imaging of the dorsal neocortex. Also provided are montages illustrating mesoscale calcium dynamics at different time scales revealing transitions between recurrent activity motifs. (C) A voronoid diagram illustrates the discretization of high-dimensional state space describing mesoscale cortical imaging into Markov Element centroids, and the resulting transition probability matrix that results from a continuous time Markov chain model of mesoscale cortical activity. (D) Transition probability matrices (TPM) provide a compact and reproducible representation of high-dimensional mesoscale state space and capable of detecting differences in mesoscale dynamics. (E) A selection of Markov Elements are illustrated revealing the complex spatial features that characterize recurrent mesoscale activity motifs. (F) An increasing number of Markov Elements results in finer parcellation of the state space and plateauing improvements to the reconstruction error. (G) A montage illustrates an epoch of mesoscale calcium activity and the associated continuous time Markov chain model reconstruction with increasing number of Markov Elements. Note the relative paucity of transitions with fewer Markov Elements and the large deviation from the original recording that improves with increasing Markov Elements. (H) Representative transition probability matrices for two mice with increasing number of Markov Elements is illustrated, as well as the average transition probability matrix for n=10 recordings. (I) Representative Markov Element occupancy distributions, representing the frame count for each element, for two mice with increasing number of Markov Elements is illustrated, as well as the average occupancy distribution for n=10 recordings.
Figure 2:
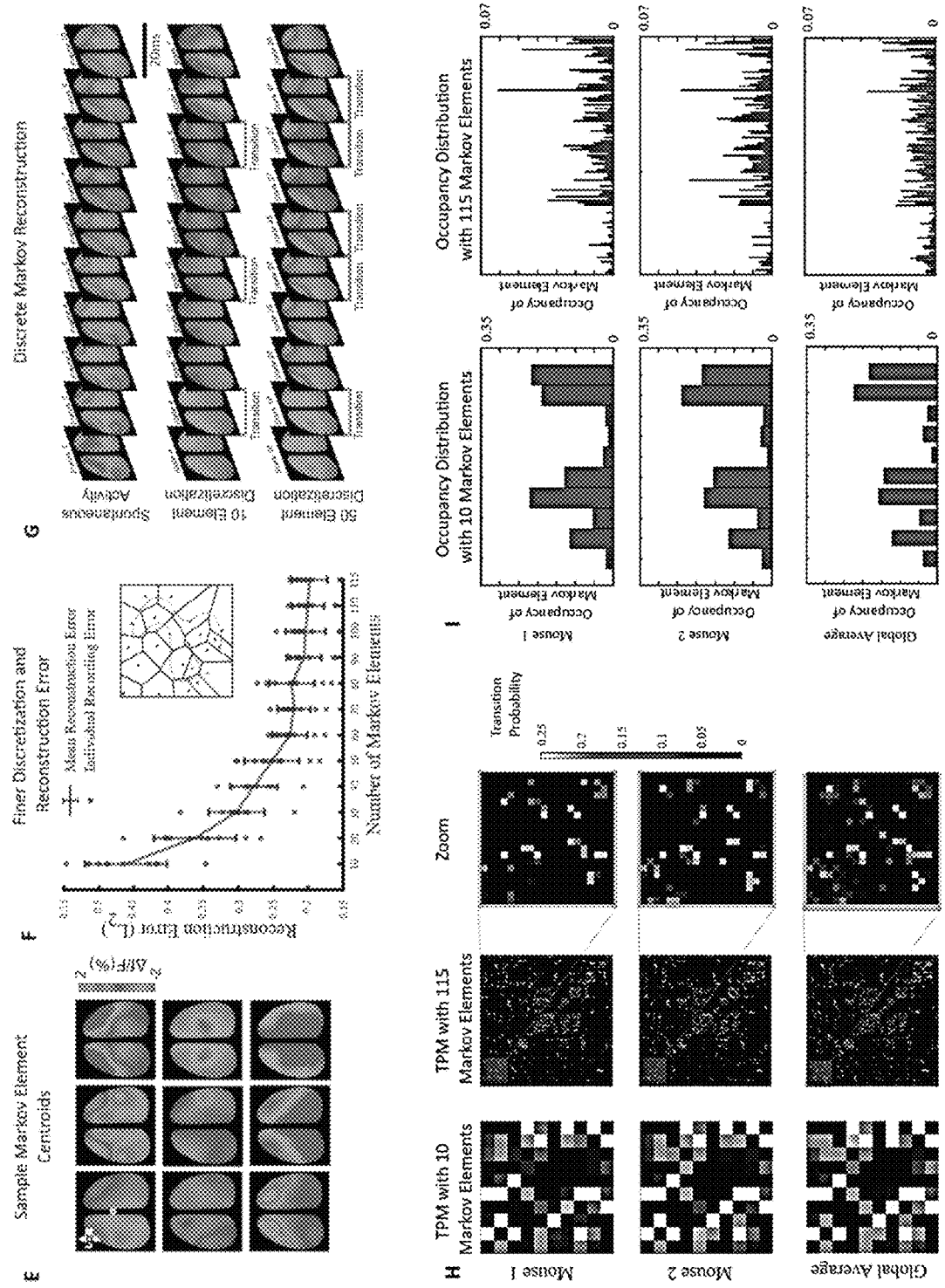
Figure 3:
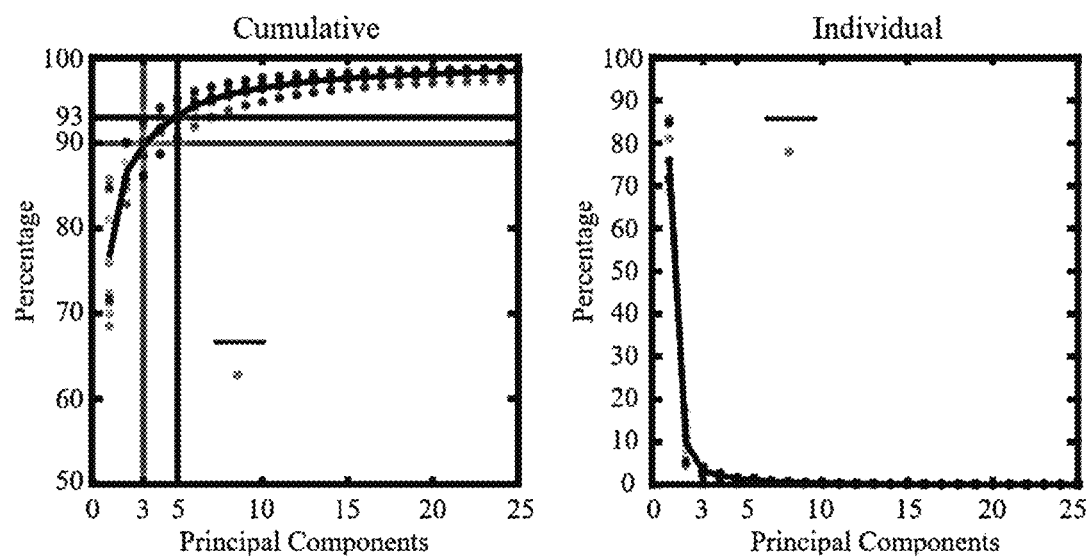
FIG. 3 illustrates variance in the original recordings explained by principal component analysis. (A) The cumulative variance explained by principal components in a low dimensional representation of the 10 spontaneous activity recordings as given in FIG. 2. Approximately 90% of the cumulative variance can be explained with the first three principal components and approximately 93% of the explained variance with the first 5 principal components. (B) The individual variance explained by principal components similarly shows that the first principal components explain the majority of the explained variance.

To investigate the brain's intrinsic grammar, in vivo mesoscale imaging for a total of 83 (38F/45M) awake head fixed mice (FIG. 2A) was performed. Transgenic Thy1-jRGECO1a mice[25] expressing the red shifted calcium indicator received chronic windows exposing dorsal neocortex, with registration to the Allen Brain Atlas to allow the direct comparison of neural dynamics across mice (FIG. 2B). Intrinsically, the "raw" calcium dynamics of this system can span a high-dimensional state-space consisting of independent trajectories of thousands of pixels (FIG. 2C). For individual mice, the overall dimension of the raw dynamics was low with 90% of the variance explained with 3 principal components (FIG. 3), indicating that calcium activity trajectories are not independent in this high dimensional space[26].

While the mesoscale raw recordings and raw file sizes suffer from a conventional 'big-data' problem, the low dimensional dynamics allow for a more compact representation of the calcium dynamics. A state-space discretization approach was applied (FIG. 2C-2D). The state space was discretized into zones each defined by a central Markov Element that is the high dimensional space centroid determined by a simple, yet scalable, k-means clustering algorithm applied to 21,175 frames selected at random from 847 recordings (25 randomly selected frames per recording). The calcium dynamics of each recording was then tracked as the high-dimensional dynamics crossed from one zone to the next (FIG. 2D), with the information then used to create a Transition Probability Matrix (TPM), a matrix that yields the probability matrix of crossing from one zone to another. This matrix defines how a single recording moves across high-dimensional space in a compact yet interpretable representation (FIG. 2D).

Figure 4:
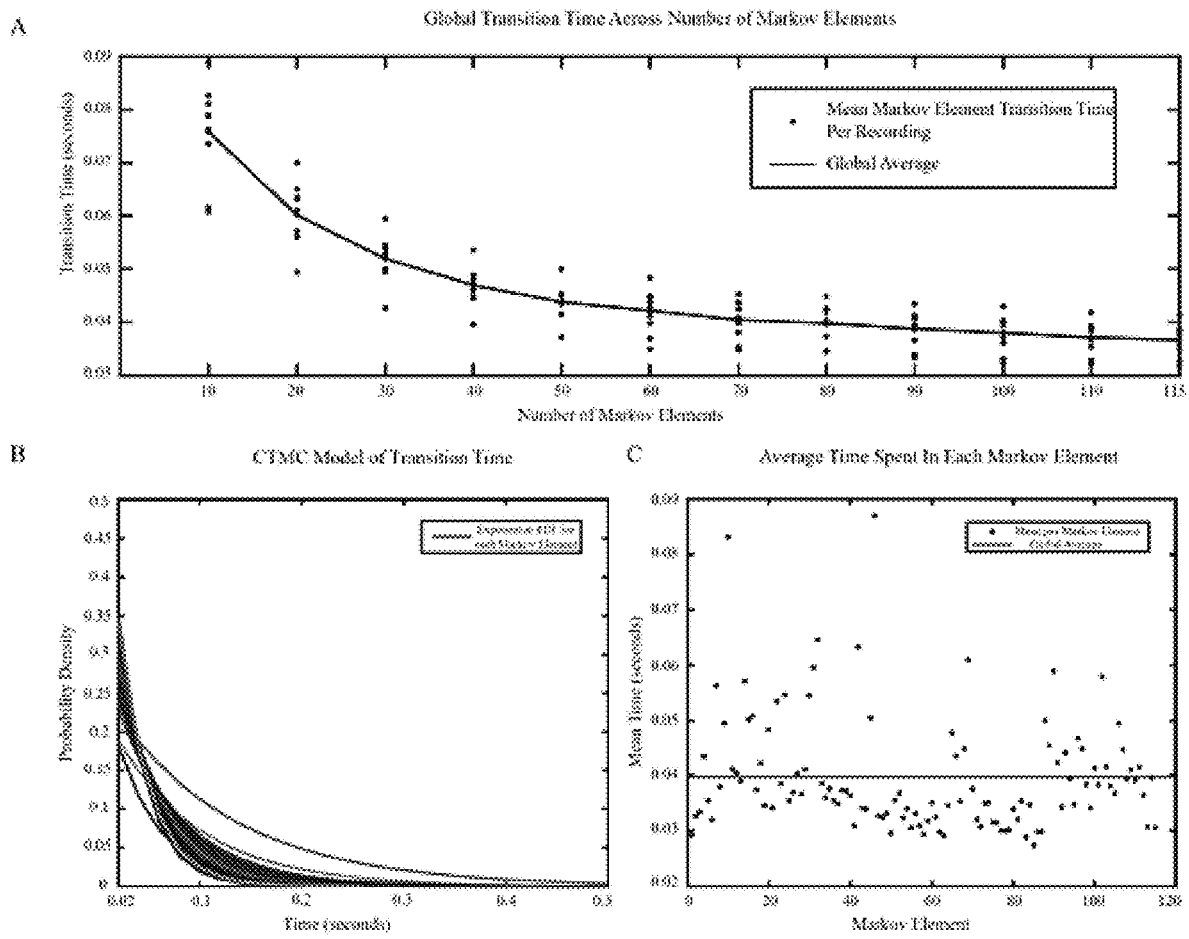
FIG. 4 illustrates transitions between Markov Elements in the continuous time Markov chain model. (A) The mean transition time across all Markov Elements in each recording is computed for increasing numbers of Markov Elements in the continuous time Markov chain (CTMC) model. (B) A CTMC model of transition time is computed for each of the 115 Markov Elements from FIG. 2. The transition time is approximately exponential for each Markov Element, so that an exponential model was fit and the corresponding probability density function is given. Here, transition time is defined as time spent in one Markov Element before transitioning to another. (C) The mean transition time spent in each Markov Element from the CTMC model. (D) details probability density over time for each quartile. (E) details the root-mean-squared error (RMSE).
Figure 4:
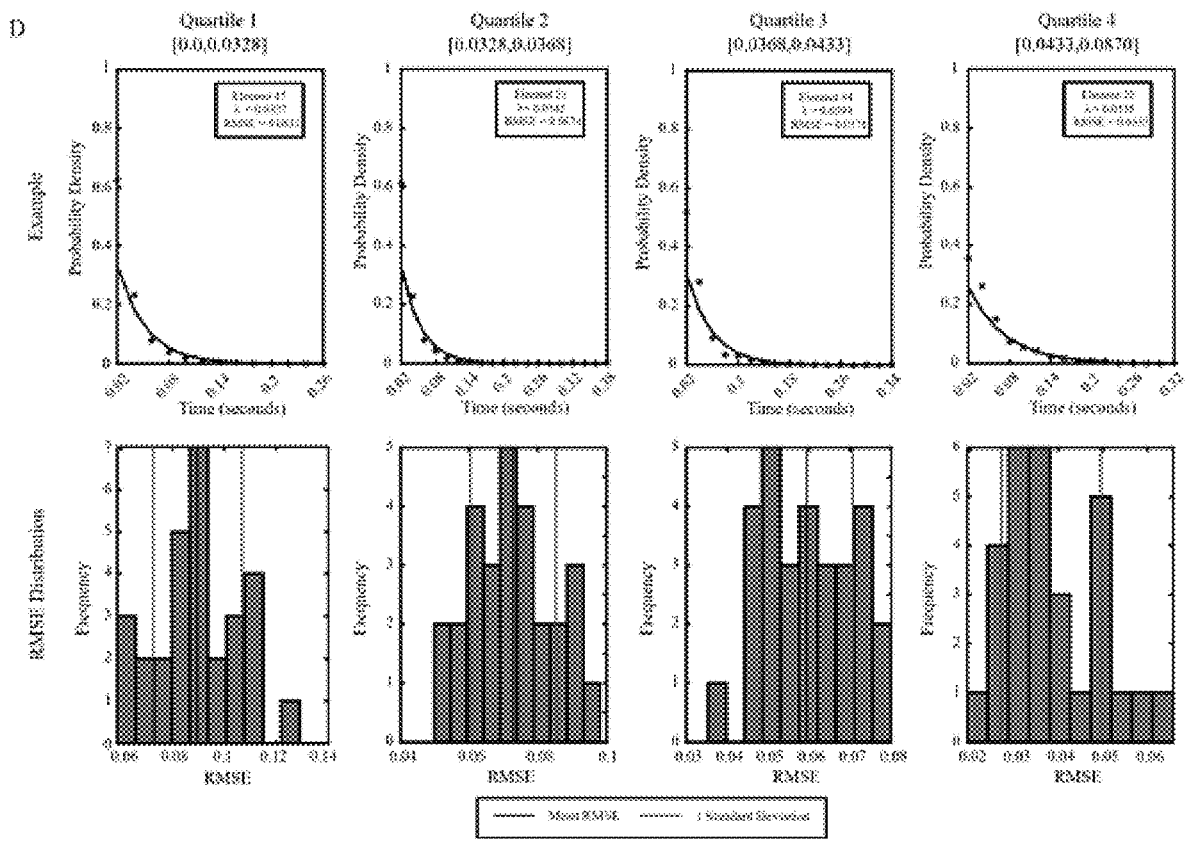
Figure 5:
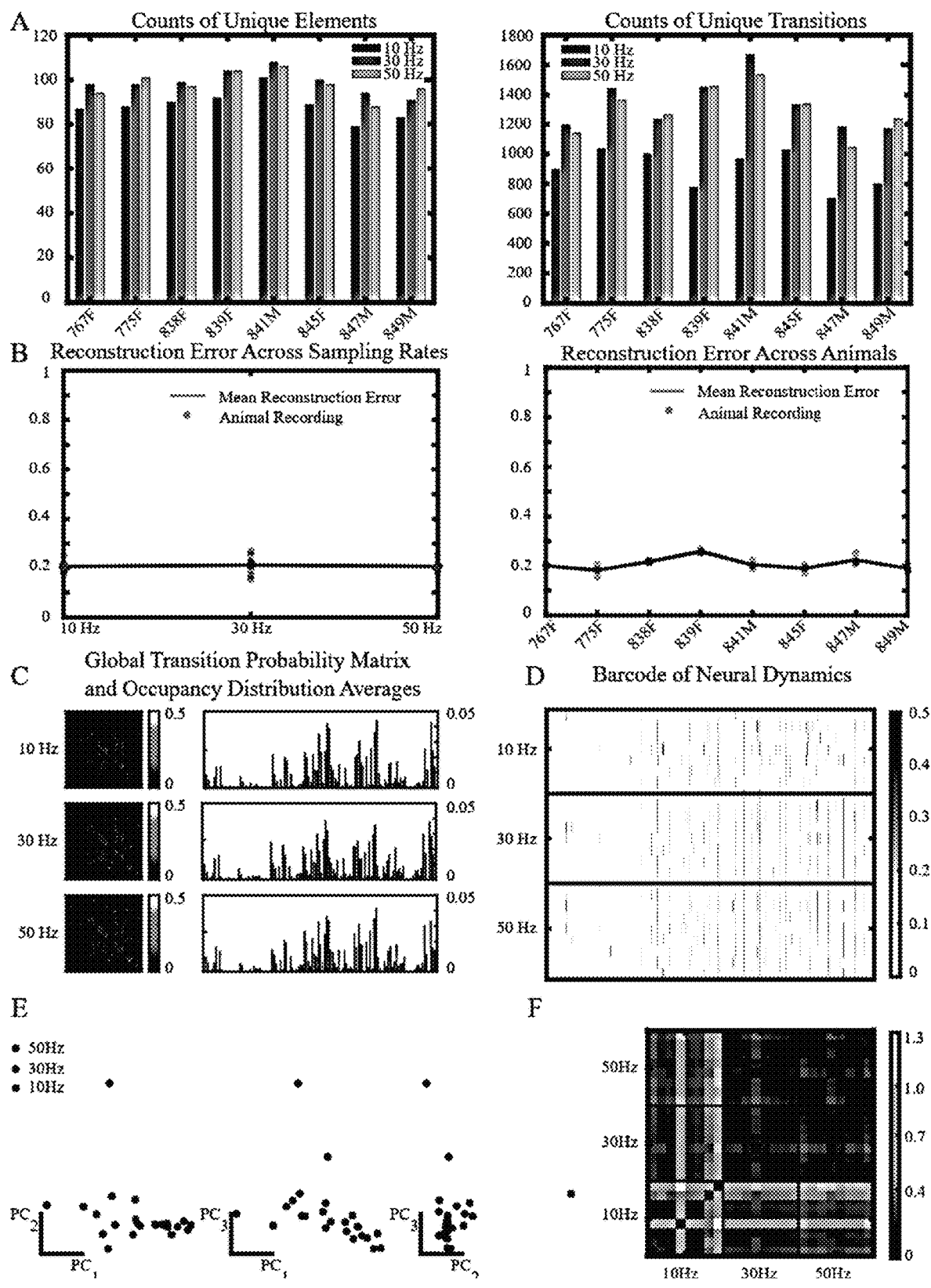
FIG. 5 illustrates continuous time Markov chain models are robust at different mesoscale activity acquisition rates. (A) The total number of Markov Elements (out of 115) that occur in n=8 mice from whom mesoscale cortical activity was acquired at different sampling rates and exposure times (10 Hz or 99.7 ms exposure, 30 Hz or 33.3 ms exposure, and 50 Hz or 19.7 ms exposure). Across recordings a slight overall decrease in unique states in the 10 Hz sampling regime was observed. (B) A 10 Hz acquisition rate resulted in fewer total transitions in recordings matched for acquisition durations, whereas 30 Hz and 50 Hz were comparable. (C) Imaging acquisition rates did not significantly impact the reconstruction error and match those found asymptotically in FIG. 2F in a non-overlapping group of n=10 mice. (D) Imaging acquisition rates also did not result in different reconstruction error estimates within the same animal. (E) Representative transition probability matrices and occupancy distributions are illustrated for a single mouse for mesoscale cortical activity imaged at 10 Hz, 30 Hz and 50 Hz. Across sampling rates, preservation of the transition matrices and occupancy distributions is observed. (F) The Markovian neural barcode derived from n=8 mice imaged at 10 Hz, 30 Hz, and 50 Hz reveals conserved banding and a presented structure across acquisition rates. (G) A low-dimensional representation of the Markovian neural barcode using the first three principal components nevertheless demonstrates clear clustering within the different sampling rates in principal component space. (H) A principal component distance projection facilitated visualization of the differences and similarities in dynamics as shown in (G). Here, the similarity between the 30 and 50 Hz recordings are easily seen in contrast to those at 10 Hz.

The Markov Elements corresponded to an amalgamation of common frames (FIG. 2E). The resulting algorithm identified 200 clusters of interest, which were manually curated to 115 to remove redundancy and artifacts. As more Markov Elements are used, the reconstruction error between raw recording and its projection on to its Markov Element decreases (FIG. 2F-G). This error is defined by replacing a frame with the Markov Element of the corresponding zone the frame occupies, and then measuring the Euclidean difference between the two, integrated over all frames (i.e. the root-mean-squared error RMSE). Accordingly, increasing the number of Markov Elements decreases the dwell time in each state (FIG. 4). The data provides evidence that although the reconstruction error continues to improve with the addition of more Markov Elements, high-dimensional mesoscale dynamics can be adequately represented by a finite number of Markov Elements and that the reconstruction error plateaus by 115 Elements. This was also robust to different sampling frequencies (10 Hz, 30 Hz and 50 Hz) indicating that Markovian grammar can describe mesoscale dynamics at commonly used sampling rates (FIG. 5).

Figure 7:
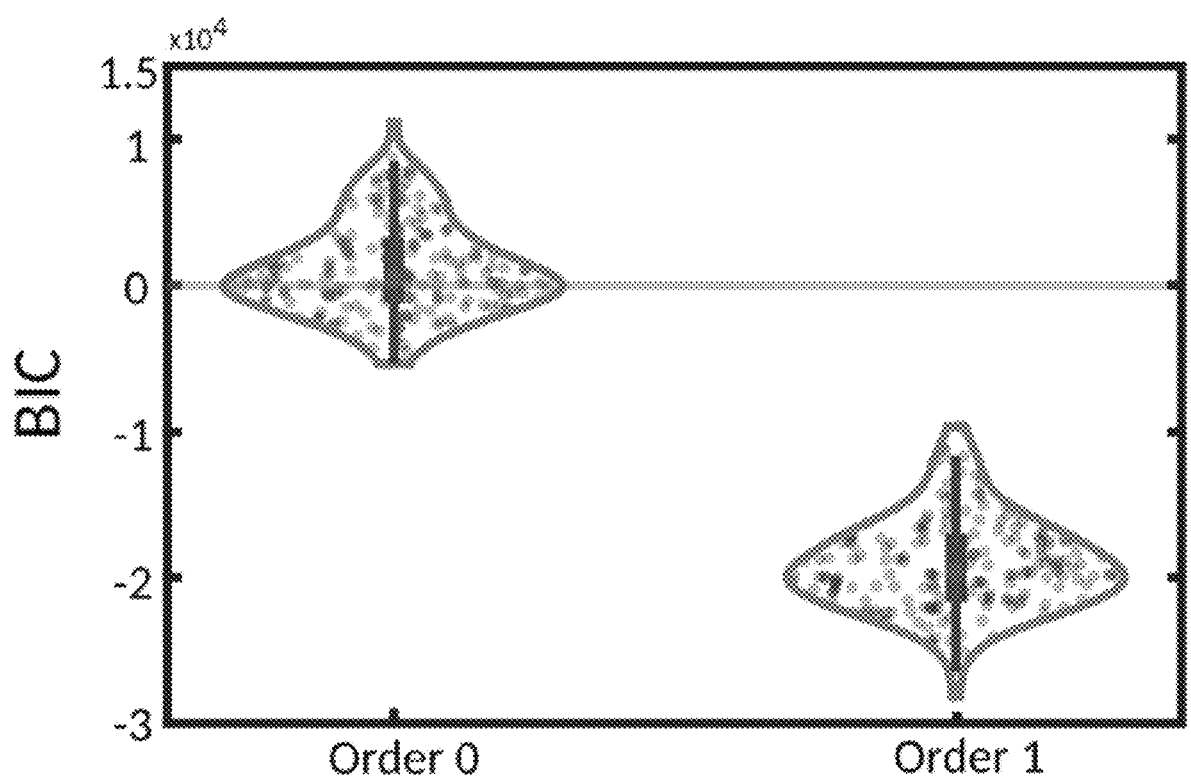
FIG. 7 illustrates order estimation of the Markov process. Using Bayesian Information Criterion (BIC) and the n=180 recordings described in FIG. 6, zero and first order Markov models were compared to a second order Markov model. It was found that a first order Markov model is always preferred over a second order Markov model, where as a zero order Markov model shows no clear preference against a second order model.
Figure 8:
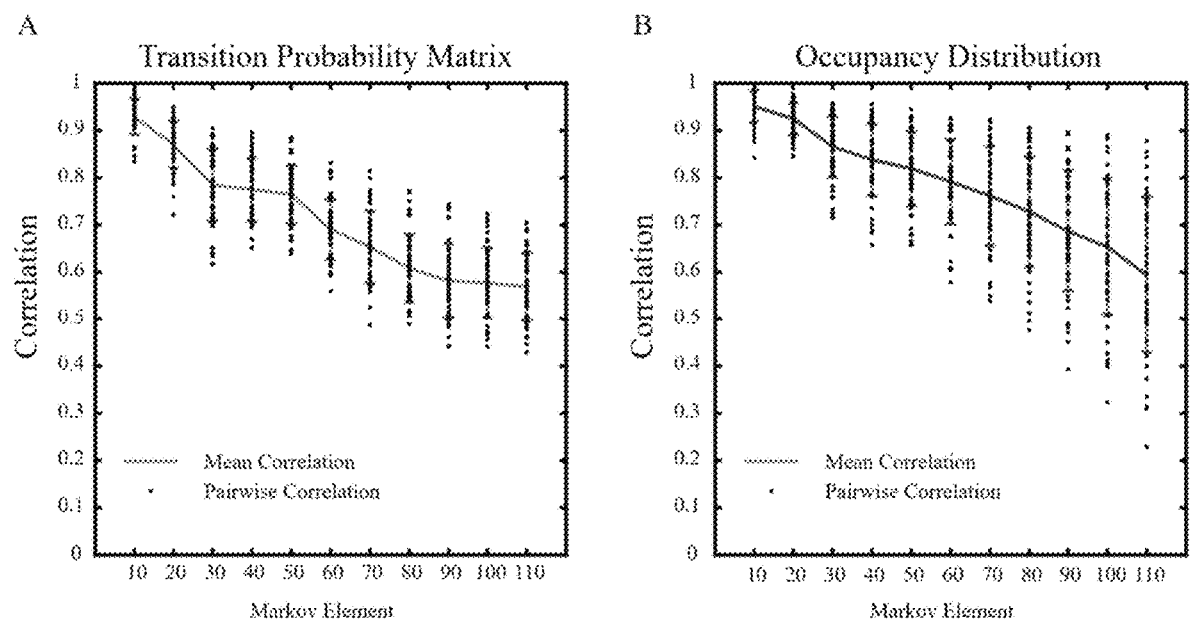
FIG. 8 illustrates correlation between transition probability matrices and occupancy distributions with increasing number of Markov Elements. (A) The correlation between transition probability matrices derived from n=10 mice with increasing number of Markov Elements reveals a common transition structure, however, suggests individual variability. (B) The correlation between occupancy distributions from the CTMC models for these n=10 mice with increasing number of Markov Elements revealed that the inter-animal consistency in transition probability matrices was robust to very different dynamical trajectories through Markov Elements and number of times these Elements are represented.

With the definition of the Markov Elements complete, the order of the Markov Process, or the dependence of motif transitions on previous neocortical activity motifs (Markov Elements) was estimated. Specifically, a zero order Markov Process models independence of future state from current state, whereas first order process models probability from the current motif, and a second order process models probability on doublet sequences. A first-order Markov Process was found superior to zero or second-order processes (FIG. 7). The resulting structure of the TPMs generated for all mice as the number of Markov Elements increase was investigated. Striking, matrix-wide similarities across the TPMs generated which was true for small or increasing number of Markov Elements used was found (FIG. 2H; FIG. 8). This was also true for the occupancy distribution of Markov Elements, which is the frequency count of motif frames as defined by a Markov Element (FIG. 2I; FIG. 8). As the transition probability matrices share similarities across mice, this implies the existence of common dynamical motifs across mice as the dynamics move in a consistent and reproducible way from zone-to-zone (FIG. 8). Evidently, the mouse-brain has an underlying dynamical grammar that is quantifiable with Markov-based approaches.

Example 2: Individual Mice Display a Unique, Reproducible Dynamical Signature or Barcode While the TPMs and occupancy distributions showed a common neural grammar across mice (FIG. 8), it also revealed individual variability. To test whether individual variability was reproducible and represented a dynamical signature in motif sequencing and the Markovian neural barcode, 45 mice were imaged a total of 4 times (baseline, +1 hour, +2 hours, +24 hours), returning them to their homecage after each recording (FIG. 6A). This generated 4 TPMs and occupancy distribution per mouse (FIG. 6B-C) to inform intra- and inter-day consistency of motif sequencing. These TPMs and occupancy distributions show mouse-specific deviations from the common brain-grammar shown in FIG. 2.

Figure 9:
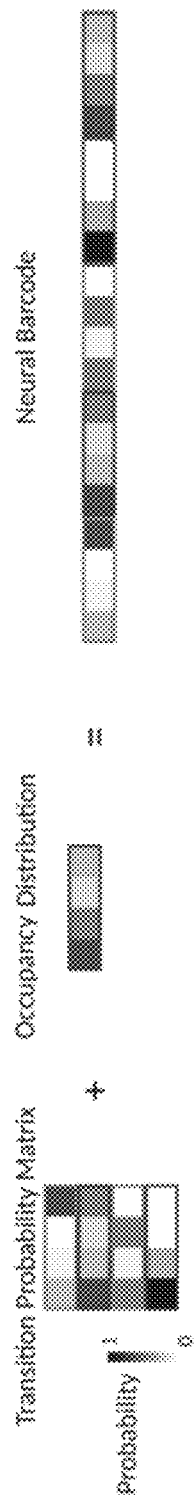
FIG. 9 illustrates construction of the Markovian neural barcode. The Markovian neural barcode is constructed by unwrapping each transition probability matric row by row and concatenating with the associated occupancy distribution. In this way, a 115×115 transition probability matrix and 1×115 occupancy distribution, form a Neural Barcode row vector of size 1*(13,225 (transitions)+115 (occupancy)).

To quantify and visualize the unique neural grammar that individual mice displayed, the TPMs and the occupancy distributions into a single vector (FIG. 9), "the Markovian neural barcode" (FIG. 6D-E). By linearizing TPMs and occupancy distributions, the Markovian neural barcode allows for conventional dimensional reduction techniques to be applied across animals. The barcode also readily visualizes both the common grammatical structure of the brain's underlying dynamics and the individual specific deviations.

Figure 10:
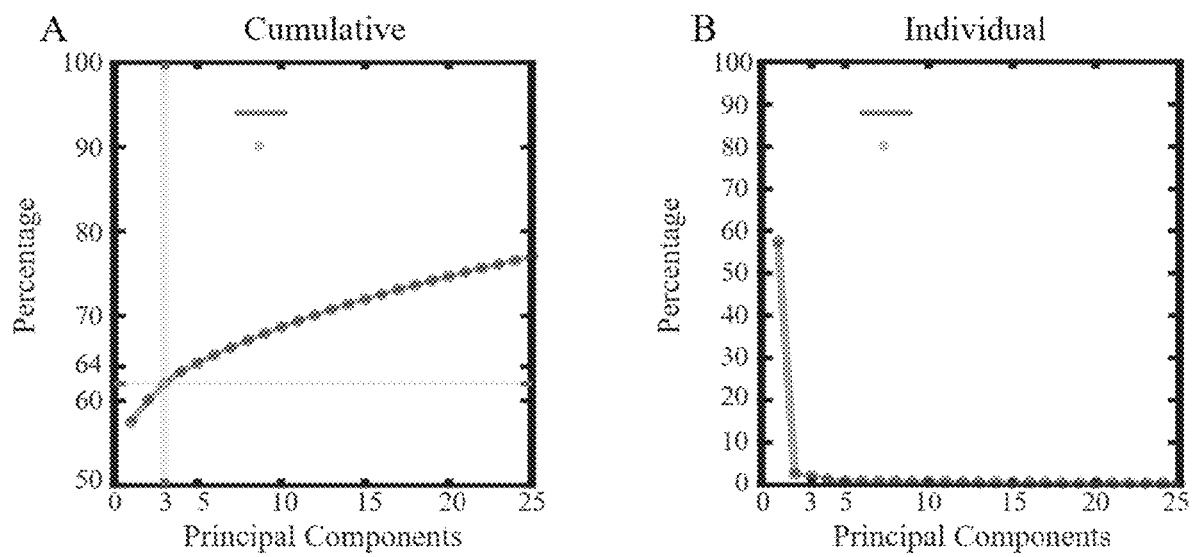
FIG. 10 illustrates variance explained in the Markovian neural barcode by principal component analysis. (A) The cumulative and individual variance explained by principal components in a low dimensional representation of the Markovian neural barcode from FIG. 6. Approximately 62% of the cumulative variance can be explained with the first three principal components and approximately 64% of the explained variance with the first 5 principal components. This is also observed in the variance explained by each individual principal component.

Principal Component Analysis (PCA) was applied to the neural barcodes (FIG. 6E). 64% of the variance was explained with 5 principal components, which indicates that the neural barcode also has low-dimensional features, although occupies a higher dimensional space than any one raw recording (FIG. 10). A high-dimensional representation of the Markovian neural barcode contains information describing motif transitions and occupancy over a full recording, however low-dimensional features indicate a common grammar and deviations from this grammar across recordings. These low-dimensional features were visualized by examining the first three principal components (PC) for each mouse recording (FIG. 6F). For each mouse, the 4 recordings clustered together in low-dimensional space. This indicates that for any individual mouse, the TPMs and the occupancy distribution are idiosyncratic, with reproducible features both within and between days. This was also visible as a block-like structure over the PC-distance matrix (FIG. 6F). Finally, to test if the individual clustering was statistically significant, an intra-vs-inter-PC-distance comparison between the two resulting distributions was employed (FIG. 6G). If an individual animal's recordings are not clustered in comparison to the total population's recordings, then the intra-animal distances should be drawn from a comparable distribution to the inter-animal distances. This hypothesis was rejected (Intra-Animal 0.06±0.042; Inter-Animal 0.13±0.069; Wilcoxon Rank Sum Test, p=1.14e-71). Indeed, the intra-animal distances were on average much smaller (FIG. 6H) than the inter-animal distances, indicating substantial clustering of a single-animals repeated recordings. The robustness of the results were also tested alongside alternative dimension reduction techniques and random permutations of the animal groups (FIG. 11). It was found similar results for an intra-vs-inter distance comparison across dimension reduction techniques (tsne: Intra-Animal 1.826±1.713; Inter-Animal 3.496±1.682, NNMF: Intra-Animal 0.741±0.504; Inter-Animal 1.349±0.729, PCA: Intra-Animal 0.035±0.033; Inter-Animal 0.086±0.063; Wilcoxon Rank Sum Test, p=4.13e-57, 2.21e-48, 7.19e-54; FIG. 11). It was also found that when testing the significance of individual clustering by intra-vs-inter animal distances against randomly permutating indices, that only 5 out of 1000 permutations yielded statistically significant results (Wilcoxon Rank Sum Test, mean p-value=0.58).

Thus, while there are common features to motif sequencing across mouse brains, each mouse has had unique development and experiences that result in idiosyncratic features in brain dynamics that distinguish it from other mice.

Example 3: Dynamical Signatures are Impacted by Seizures

Maximal electroconvulsive seizures (MES) (FIG. 12A) was used to ask how the brain's underlying grammar would be altered following the dynamical states associated with seizures[28]. Seizures are a powerful test of brain dynamics because the induced hypersynchronous and hyperexcitable neural events results in a predictable pattern of electrical activity, whereby the seizure is followed by suppression of activity dynamics, and then a gradual increase in neural activity power (FIG. 12B). Nevertheless, physiology[29] and behavior[30] remain persistently disrupted after termination of the seizure. Headfixed mice (n=7) were imaged as they received 0.2 seconds of electrical stimulation to induce a generalized MES in a continuous 15-minute recording such that F/F0 was computed identically for baseline and post-ictal epochs. Next, the neural barcode was constructed using the 115 generalized Markov Elements for the baseline and for post-ictal epochs (FIG. 12A). These are long recordings, and therefore to account for photobleaching or other effects of time, a control recording of the same length three days prior (3d pre-MES) was acquired. Changes in dynamics due to MES by comparing matched epochs within the acquisitions were isolated.

A clear separation of the post-ictal state from the 3 day pre-ictal and baseline controls in principal component space (FIG. 12C) and in the PC-distances (FIG. 12D) was found. This separation was statistically significant in the PC-distance distributions in the pre-vs post-ictal (FIG. 12E Post-MES 0.47±0.087; Pre-MES 0.24±0.20; Control-Baseline 0.22±0.18; Control-Late 0.25±0.20; Wilcoxon Rank Sum Test, p=3.82e-7, 0.54, 0.96), the post-MES condition was significantly different than both epochs of the control conditions, meanwhile there was no difference between the two control conditions (early vs late) and the pre-MES baseline. Indeed, the occupancy distributions of pre- and post-MES dynamics were uncorrelated (FIG. 12F, $r^2$=0.014, p=0.20) which was not the case with the baseline-MES and control conditions (FIG. 12F, $r^2$=0.20, p=2.2e-33 The change in Markov Element representation was correlated with the amplitude of the Markov Element (FIG. 13, $r^2$=0.26, p=4.6e-9), indicating that the post-MES condition was characterized by spatially uniform high and low amplitude states, and at the expense of typically occurring motifs. It was also found that many of the transitions between normative motifs in the post-MES state did not occur or rarely occurred (FIG. 12G). Thus, the Markovian neural barcode revealed both upregulation and sparsity in the transition probability matrix as a consequence of seizure. Evidently, the grammar of the brain can change as a result of extreme excitation.

Example 4: Sensory Processing Alters Dynamic Content but not 'Grammar'

A central question is whether cortical grammar is internally generated, or whether it represents an integration of spontaneous activity, movement and sensory processing[12,26,31]. To test this, sensory stimuli were used to determine whether the introduction of regional sensory activity would integrate into motifs, in which case they would follow a transition probability for the combined sensory and spontaneous activity, or whether they would continue with the grammar of the trajectory that preceded the sensory stimulus. Simply put, does the unique state resulting from the combination of spontaneous activity and sensory processing then bias the subsequent repertoire of neural states? This is important, because it has implications for how neural states stage responses for context specific behaviors.

To investigate this, mesoscale cortical dynamics were sampled while animals received full field flashes directed to the right eye (5 ms, 450 nm LED, Thorlabs; FIG. 14A). The LED illuminated every 3 seconds with a 1 second jitter to minimize anticipation and habituation, without any task or reward contingencies. The visual stimulation produced a consistent visual neocortex response, however the individual trials revealed visual cortex activity overlying ongoing spontaneous cortical dynamics[5,32] (FIG. 14B). Thus, the trial-by-trial dynamics following sensory stimulation can inform whether pre-existing activity trajectories continue despite sensory processing, or whether sensory processing integrates with spontaneous activity to instate a new motif that then follows its grammatical trajectory.

The time-series of Markov Elements plotted was considered as an occupancy raster (FIG. 14C). The impact of visual stimulation was apparent as a trial-aligned average (FIG. 14D-E) which was significantly different from a random control. Further, the visual stimuli up-regulated transitions to Markov Elements with primary and secondary visual cortex activation (FIG. 16), uniliteral representations more so than bilateral, and down-regulated Elements with these characteristics (FIG. 14F). To assess the impacts on grammar and content, the neural barcode was constructed (FIG. 14G) and applied a principal component analysis under two conditions: Grammar+Content (TPMs+occupancy distribution), Grammar alone (TPMs) or content alone (occupancy distribution). It was found that the occupancy distribution was substantially different in the visual stimulation vs control condition, indicating a greater representation of motifs with visual cortex activation, yet the TPMs or the combined TPMs and occupancy distribution barcode were unchanged (FIG. 14H-I; Inter/Intra: Occupancy Only 0.60±0.09/0.45±0.28; TPM Only 0.53±0.19/0.45±0.20; Full 0.54±0.19/0.45±0.20; Wilcoxon Rank Sum Test, p=2.3e-3, 0.09, 0.09). This demonstrates that sensory processing integrates with motifs represented within the common lexicon of neural activity. Yet, an overrepresentation of these motifs has no impact on grammar, indicating that the neural trajectory prior to sensory stimulation has incorporated a change to the neocortical activity motif to reflect the grammar imposed by this new motif. This preservation of grammar under changing conditions has important implications for how the brain maintains a dynamic state of readiness to respond to the environment. At a more fundamental level, it confirms that mesoscale cortical dynamic content can change without impacting its intrinsic sequential structure, or grammar.

Example 5: Pharmacologically Generated Diversity of Dynamical Signatures

Whether pharmacological manipulations would impact mesoscale grammar as it does behavioral grammar[17,23] was considered. How this might occur depends on the specific pharmacological intervention, just as the sedated mouse may spend time in more or less anxious contexts with no bearing on its actual anxiety-like state. It was therefore focused on pharmacological manipulations targeting neuromodulators and anesthetics to determine their effect on grammar (FIG. 15A). This was tested in n=47 animals (103 total recordings; vehicle: 19, clomipramine: 10; fluoxetine: 7; desipramine: 7; venlafaxine: 10; rasagiline: 10; tranylcypromine: 9; haloperidol: 9; risperidone: 6; ketamine: 10; isoflurane: 6). The mice were pseudorandomly assigned to different pharmacological interventions, receiving no more than two pharmacological agents of different classes in counterbalanced order one week apart.

A total of ten pharmacological agents from five classes and a physiological saline vehicle control were utilized: 1) the serotonergic reuptake inhibitors fluoxetine and clomipramine, 2) the noradrenergic reuptake inhibitors venlafaxine and desipramine, 3) inhibitors of monoamine oxidase tranylcypromine and rasagiline, 4) the dopamine receptor antagonists risperidone and haloperidol and 5) low doses of the anesthetics ketamine and isoflurane. Dosing was selected based on behaviorally sufficient effects. Thirty minutes after administration, with the exceptions of ketamine where imaging occurred 15 minutes after administration and isoflurane once body temperature had stabilized, animals were head-fixed for awake sampling of cortical dynamics. From these spontaneous dynamics, the neural barcode associated with the vehicle and each of the pharmacological manipulations (FIG. 15B) were constructed. The barcode readily demonstrated within-class and within-drug banding effects, indicating that specific transitions and Markov Elements were upregulated or down-regulated relative to the vehicle condition. Next, PCA was applied and plotted the first three PCs in each drug class relative to the vehicle (FIG. 15C). This revealed clear class effects, however in some classes pharmacological differences between agents could be observed.

For instance, consistent effects were seen classes for serotonergic reuptake inhibitors, noradrenergic reuptake inhibitor, and dopamine receptor 2 antagonists, however monoamine oxidase inhibitors had different effects based on their selectivity for MAO-A or MOA-B. Unexpectedly, low-dose anesthetics with different mechanisms of action, isoflurane and ketamine, had similar effects on cortical grammar. (clomipramine: p=0.84; fluoxetine: p=0.60; desipramine: p=0.05; venlafaxine: p=0.14; rasagiline: p=0.03; tranylcypromine: p=6.6e-6; haloperidol: p=3.1e-7; risperidone: p=1.1e-29; ketamine: p=2.3e-5; isoflurane: p=1e-3).

Thus, pharmacologically generated diversity in the Makovian neural barcode shows class specific effects, but just as individual animal signatures are observed, the properties of specific compounds impact neocortical grammar in unique ways despite class similarities.

Example 6: Human Neural Barcodes for fMRI Data

Referring to FIG. 17-20, neural barcodes were generated from fMRI data. The midnight scan club data is a publicly available MRI dataset [1]. The fMRI data was processed into a series of 431 anatomical regions. Each of the individuals (n=9) had their frames randomly sampled, and clustered with k-means to produce n Markov elements.

These Markov elements were applied to the entire data set to determine the Markovian neural barcode with precisely the same methods as in the mouse imaging. The Markovian neural barcode was computed for the entire duration of the data set, and for each individual, the first half, or the second half to compare the stability of the baseline recordings. Principal component analysis was applied to the resulting neural barcodes for visualization.

1. Gordon, E. M., Laumann, T. O., Gilmore, A. W., Newbold, D. J., Greene, D. J., Berg, J. J., . . . & Dosenbach, N. U. (2017). Precision functional mapping of individual human brains. *Neuron,* 95 (4), 791-807.

Methods of the Examples

Animals

Male and female adult C57BL/6J-Tg(Thy1-jRGECO1a) GP8.58Dkim/J[25] mice (8-16 weeks old), constitutively expressing the red-shifted calcium indicator jRGECO1a under the Thy-1 promoter were used for all experiments. Mice were group housed on a 12:12 light cycle with ad libitum access to food and water.

Surgeries

Chronic skull intact window surgeries were performed as previously described[36]. Mice were isoflurane anesthetized (4% induction, 1.5-2.5% maintenance, 0.5 L/min oxygen) and buprenorphine (0.03 mg/kg) was administered subcutaneously for analgesia. Bupivacaine (Sterimax, intradermal, 0.05 mL) was administered locally at the excision site. Body temperature was maintained at 37° C. with a feedback thermistor, and eyes were protected with lubricant (Opticare, CLC Medica). Following disinfection with 3× alternating chlorhexidine (2%) and alcohol (70%), the skull was exposed with a skin excision from 3 mm anterior to bregma to 2 mm posterior to lambda, and bilaterally to the temporalis muscles. A metal screw was fix to the skull with cyanoacrylate prior to embedding in transparent dental cement (C&B-Metabond, Parkell). A flat 9×9 mm glass coverslip (tapered by 2 mm anteriorly) was fixed to the skull with transparent dental cement, taking care to avoid the formation of air pockets. Mice recovered for 7 days prior to further interventions, allowing for full cement hardening and wound healing.

Electrodes constructed from Teflon-coated stainless-steel wire (178 μm diameter, A-M Systems) were connected to gold plated male amphenol pins and implanted under isoflurane anesthesia as above. The electrode was implanted 750 μm into posterior parietal cortex lateral to the chronic window through temporalis muscle. The implant was anchored to the chronic window using dental cement and a ground electrode, and animals were allowed to recover for a minimum of 5 days.

Imaging Protocol

Mice were habituated to handling, head fixation with the embedded screw and the imaging apparatus including the excitation LED over 5 days. Cortical calcium activity during quiet wakefulness was sampled using a macroscope (Nikon 55 mm lens, f/2.8 aperture) and a Quantalux 2.1 MP Monochrome sCMOS Camera (Thorlabs). 16-bit images with 19.7 ms temporal resolution (50 Hz) and 256×256 pixel resolution (26.5 px/mm) were acquired. Using a 567 nm excitation LED in conjunction with a 540/80 filter (Semrock) attached to an articulating arm, a wide expanse of dorsal neocortex (10-15 mW/cm$^2$) was illuminated. Emission fluorescence was filtered with a 629/56 bandpass filter (Semrock). Focus was set ~500 mm below the cortical surface to minimize signal distortion from large blood vessels. Illumination and frame capture was controlled using commercial software (Labeo Technologies, Inc).

Recordings were of different lengths for different experiments; however all acquisitions were at 50 Hz temporal resolution with the exception of those intended to determine the effect of sampling frequency on the Markovian neural barcode. For experiments imaging under quiet wakefulness and for pharmacological experiments, spontaneous cortical activity was recorded for 22,500 frames (7.5 minutes). For maximal electrical stimulation (MES) seizure induction experiments neocortical calcium activity was sampled at 50 Hz for 45,000 frames, corresponding to a 5-minute recording of cortical activity prior to MES, followed by 10 minutes of cortical activity after the seizure. Visual stimulation experiments involved sampling 40,000 frames of mesoscale cortical calcium dynamics.

Image Analysis

Image stacks were analyzed using custom-written MATLAB code (Mathworks, MA). Pixel responses were expressed as a change in fluorescence relative to pixel mean fluorescence over the duration of the recording (ΔF/F0). For MES experiments, this was expressed relative to the pixel mean fluorescence over the five minutes preceding MES. The individual time-varying pixel signals were bandpass filtered (0.1-15 Hz) for analysis. MES experiments and associated controls were bandpass filtered 0.1-20 Hz. Each image stack was aligned to the Allen Institute for Brain Science Mouse Brain Atlas common coordinate framework (CCF) using rigid transformation to anatomical landmarks. To restrict analysis to cortical activity during periods of quiet wakefulness, movement frames were identified as a deviation of the mean square error of spatial high-pass images from the mean image and removed prior to analyses, corresponding to 20±5% of frames excluded from recordings. A common mask was applied to all recordings to remove pixels peripheral to the chronic window and neocortex.

Inter- and Intra-Individual Variability in Cortical Dynamics

A subset of naïve animals were recorded repeatedly to estimate the inter- and intra-individual variability in spontaneous cortical calcium dynamics. To achieve this, animals were repeatedly imaged both within and across days and animals were returned to their homecage between recordings. Specifically, spontaneous cortical activity was sampled at baseline, after one hour, after two hours, and after 24 hours.

Maximal Electroconvulsive Shock (MES)

A suprathreshold maximal electoconvulsive shock (MES) stimulus was used to elicit a controlled generalized tonic clonic convulsion. This was delivered by a GSC 700 shock generator (model E1100DA, Grason-Stadler) through ear clips to, consisting of a 0.2 s biphasic 60 Hz sine wave pulse. As a control for MES effects on neocortical dynamics, spontaneous cortical calcium activity was sampled without any intervention two days prior to MES.

Visual Stimulation

To determine the impact of sensory information on the structure of cortical dynamics during quiet wakefulness, neocortical activity was sampled as headfixed animals received monocular visual stimulation in the form of a full field flash. To minimize contamination of the imaging field a 450 nm LED (M450LP1, Thorlabs) directed to the mouse's right eye was utilized. Cortical calcium activity was sampled as animals received 200 5 ms full field flashes with a 3 s inter-stimulus interval and a jitter of one second.

Drugs

To pharmacologically generate diversity in brain dynamics, mice were administered compounds of several pharmacological classes (Tocris Biosciences) and the anesthetics isoflurane or ketamine. Stock solutions were prepared in either DMSO or water, and the drugs administered by intraperitoneal (IP) injection in a 200 μL volume with ≤5% final DMSO concentration. A subset of mice underwent both a pharmacological condition and a vehicle condition consisting of saline with 5% DMSO. Imaging took place 30 minutes after IP injections, with the exception of ketamine, where mice were imaged after 15 minutes, and isoflurane, where mice were imaged 5 minutes after reaching a stable body temperature of 37° C. Dosing was as follows: clomipramine 15 mg/kg, fluoxetine 15 mg/kg, desipramine 15 mg/kg, venlafaxine 2.5 mg/kg, rasagiline 3 mg/kg, tranylcypromine 5 mg/kg, haloperidol 3 mg/kg, risperidone 1 mg/kg, ketamine 10 mg/kg, and isoflurane 1%.

Sampling the Initial Discrete Markov States

To construct the global Markov Element set, 25 frames were randomly sampled from 847 recordings across drug, acute chronic stress, acute stress, homecage control, and visual stimulus conditions, and stored these frames into a single data matrix. A global mask was then applied to each frame in this data matrix and then a K-Means clustering algorithm was used with a choice of 200 clustering centroids. These centroids were then clustered again by K-Means into 50 clusters and sorted by the given 50 cluster index. The Markov Elements were then manually curated. First, Elements typified by artifacts, including blood vessel prominence at the conclusion of bouts of movement, whisker shadows in the imaging field, and window imperfections were removed. Functionally duplicative Markov Elements were then identified by examining the correlation between states, and removing states correlated over 0.9 unless visual inspection identified anatomical significance to the structure of the calcium activity. This resulted in a final basis set of 115 Elements.

Markov Model Construction

The global Markov Element set was denoted as B. To construct a Markov chain model, M, for a given recording, R, with $n_f$ frames, each data frame, $R_i$, $i \in [1, 2, \ldots]$, was paired with a corresponding global Markov Element, $B_k$, $k \in [1, 2, \ldots, 115]$, by finding the index k that solves $$\min_k \sum_{j=1}^{256 \times 256} ((R_i)_j - (B_k)_j)^2$$

The index, $\hat{k}$, that minimizes the sum of squares difference above, is the assigned Markov element, $M_i = \hat{k}$, for frame $R_i$ of R.

Estimation of Transition Probability Matrices and Occupancy Distributions

A consistent estimator of the occupancy distribution is given from the distribution of observed frequencies in the Markov chain. The unconditional probability for the $i^{th}$ state is given by $$p_i = p(m_i) = \frac{N(m_i)}{\sum_i N(m_i)}$$

where $m_i$ is the $i^{th}$ element in the 115 element state space, and N(X) counts the occurrence, or frequency, of element X in the chain model. In the construction of the occupancy distribution, contiguous frames that occupy the same Markov Element, so called self-transitions, are considered.

The derived conditional probabilities for the corresponding transition probability matrix, P, as found by the maximum likelihood estimates[38].

$$P_{ij} = p(m_j|m_i) = \frac{N(m_i m_j)}{N(m_i)}, i, j = [1, 2, \ldots, 115]$$

In the case where state $m_i$ does not occur in the chain, it is assumed that $p_{ij}=0$, $j \in [1, \ldots, 115]$. In the construction of the transition probability matrix, self-transitions were not considered in computing the transition probability matrix.

Neural Barcode Construction

A neural barcode in the analysis was systematically constructed by unwrapping the transition probability matrix, 115× 115, for each recording into a vector, 1× $115^2$, and concatenating it's associated occupancy distribution, 1×115. Thus for an analysis with k recordings, the corresponding neural barcode is of size k×($115^2$+115)=k×13,340. For computational and visual convenience, recordings representing a common condition were grouped together in the corresponding neural barcode. For plotting clarity, columns of the neural barcode with all 0 entries, corresponding to transitions that never occurred, were removed.

Intra-Inter Group Analysis

Comparative analysis of the animal recordings using their associated transition probability matrices and occupancy distributions, as represented in the neural barcode, were done using an intra-inter group analysis.

For this intra-inter group analysis, principal component analysis was first applied to the relevant neural barcode with columns of zero mean removed, and the first five principal components for each recording were stored in a new reduced coefficient matrix. A pairwise distance matrix, say M, was then calculated from the rows of the previous reduced principal component matrix using the Euclidean norm.

To quantify the separation in principal component space between a baseline group, $G_B$, and condition group, $G_C$, the corresponding intra-inter group distances can be found from M. If the rows of M that correspond to the baseline recordings are $b_1, b_2, \ldots, b_n$ then the intra-group distances are the collection of values defined by $M(b_i, b_j)$ for i, j=1, 2, . . . , n, where repeats ($M(b_i, b_j)=M(b_j, b_i)$), and self comparisons ($M(b_i, b_i)$)) were ignored. If $c_1, c_2, \ldots, c_m$ are the rows of M corresponding to the recordings of our condition group, then the inter-group distances are the collection of values defined by $M(b_i, c_j)$ for i=1, 2, . . . , n and j=1, 2, . . . , m, where again repeats were ignored, self comparisons, and also intra-condition values ($M(c_j, c_k)$, j, k=1, 2, . . . , m).

The significance of the intra-inter group distances was tested by the Wilcoxon rank sum test. The distance was considered at a 5% significance level, with the exception of the drug application experiments where the significance level was adjusted using the Bonferroni correction.

Calculating Most Up/Down Regulated States

To calculate the most up- and down-regulated state transitions between baseline and condition recordings, the matrix of unwrapped transition probability matrices ($k \times 115^2$) for k recordings, were first organized by condition into sub-matrices, M, $G_{C_1}, \ldots, G_{C_s}$ for s conditions, where the column means, say m, $g_1, \ldots, g_s$, of size $1 \times 115^2$, were then calculated across each sub-matrix. Mean differences vectors, $v_i = m - g_i$, i=1, . . . , s, were then computed across all conditions. These difference vectors, $v_i$, can then be sorted in ascending/descending order to find the most up/down regulated state transitions indices. These indices can be decomposed into their corresponding row/column in their associated 115×115 transition probability matrix, in which, the associated global basis Elements describing that transition can then be found.

REFERENCES

1 Bullmore, E. & Sporns, O. The economy of brain network organization. *Nat Rev Neurosci* 13, 336-349 (2012).
2 Xie, Y. et al. Resolution of High-Frequency Mesoscale Intracortical Maps Using the Genetically Encoded Glutamate Sensor iGluSnFR. *J Neurosci* 36, 1261-1272 (2016).
3 Couto, J. et al. Chronic, cortex-wide imaging of specific cell populations during behavior. *Nat Protoc* 16, 3241-3263 (2021).
4 Mohajerani, M. H. et al. Spontaneous cortical activity alternates between motifs defined by regional axonal projections. *Nat Neurosci* 16, 1426-1435 (2013).
5 Arieli, A., Sterkin, A., Grinvald, A. & Aertsen, A. Dynamics of ongoing activity: explanation of the large variability in evoked cortical responses. *Science* 273, 1868-1871 (1996).
6 Chan, A. W., Mohajerani, M. H., LeDue, J. M., Wang, Y. T. & Murphy, T. H. Mesoscale infraslow spontaneous membrane potential fluctuations recapitulate high-frequency activity cortical motifs. *Nat Commun* 6, 7738 (2015).
7 Vanni, M. P., Chan, A. W., Balbi, M., Silasi, G. & Murphy, T. H. Mesoscale Mapping of Mouse Cortex Reveals Frequency-Dependent Cycling between Distinct Macroscale Functional Modules. *J Neurosci* 37, 7513-7533 (2017).
8 Afrashteh, N. et al. Spatiotemporal structure of sensory-evoked and spontaneous activity revealed by mesoscale imaging in anesthetized and awake mice. *Cell Rep* 37, 110081 (2021).
9 McGirr, A. et al. Stress impacts sensory variability through cortical sensory activity motifs. *Transl Psychiatry* 10, 20 (2020). https://doi.org:10.1038/s41398-020-0713-1
10 Rezaei, Z. et al. Prenatal stress dysregulates resting-state functional connectivity and sensory motifs. *Neurobiol Stress* 15, 100345 (2021).
11 Han, F., Caporale, N. & Dan, Y. Reverberation of recent visual experience in spontaneous cortical waves. *Neuron* 60, 321-327 (2008).
12 Poulet, J. F. & Petersen, C. C. Internal brain state regulates membrane potential synchrony in barrel cortex of behaving mice. *Nature* 454, 881-885 (2008).
13 Luczak, A., Barthó, P. & Harris, K. D. Spontaneous events outline the realm of possible sensory responses in neocortical populations. *Neuron* 62, 413-425 (2009).
14 Mackevicius, E. L. et al. Unsupervised discovery of temporal sequences in high-dimensional datasets, with applications to neuroscience. *Elife* 8, 38471 (2019).
15 Rubinov, M. & Sporns, O. Complex network measures of brain connectivity: uses and interpretations. *Neuroimage* 52, 1059-1069 (2010).
16 Pellow, S., Chopin, P., File, S. E. & Briley, M. Validation of open: closed arm entries in an elevated plus-maze as a measure of anxiety in the rat. *J Neurosci Methods* 14, 149-167 (1985).
17 Wiltschko, A. B. et al. Revealing the structure of pharmacobehavioral space through motion sequencing. *Nat Neurosci* 23, 1433-1443 (2020).
18 Chomsky, N. *Syntactic Structures*. 117 (Mouton de Gruyter, 1957).
19 Salkoff, D. B., Zagha, E., McCarthy, E. & McCormick, D. A. Movement and Performance Explain Widespread Cortical Activity in a Visual Detection Task. *Cereb Cortex* 30, 421-437 (2020).
20 Kang, M. et al. Momentary level of slow default mode network activity is associated with distinct propagation and connectivity patterns in the anesthetized mouse cortex. *J Neurophysiol* 119, 441-458 (2018).
21 Urai, A. E., Doiron, B., Leifer, A. M. & Churchland, A. K. Large-scale neural recordings call for new insights to link brain and behavior. *Nat Neurosci* 25, 11-19 (2022).
22 Fink, G. A. *Markov Models for Pattern Recognition From Theory to Applications*. 2nd ed edn, (Springer, 2014).
23 Wiltschko, A. B. et al. Mapping Sub-Second Structure in Mouse Behavior. *Neuron* 88, 1121-1135 (2015).
24 Plötz, T. & Fink, G. A. Markov models for offline handwriting recognition: a survey. *International Journal on Document Analysis and Recognition (IJDAR)* 12, 269-298 (2009).
25 Dana, H. et al. Thy1 transgenic mice expressing the red fluorescent calcium indicator jRGECO1a for neuronal population imaging in vivo. *PLOS One* 13, e0205444 (2018).
26 Musall, S., Kaufman, M. T., Juavinett, A. L., Gluf, S. & Churchland, A. K. Single-trial neural dynamics are dominated by richly varied movements. *Nat Neurosci* 22, 1677-1686 (2019).
27 Gordon, E. M. et al. Precision Functional Mapping of Individual Human Brains. *Neuron* 95, 791-807 e797 (2017).
28 Tran, C. H. T., George, A. G., Teskey, G. C. & Gordon, G. R. Seizures elevate gliovascular unit Ca2+ and cause sustained vasoconstriction. *JCI Insight* 5, 136469 (2020).
29 Farrell, J. S. et al. Postictal behavioural impairments are due to a severe prolonged hypoperfusion/hypoxia event that is COX-2 dependent. *Elife* 5, 19352 (2016).
30 Colangeli, R., Morena, M., Pittman, Q. J., Hill, M. N. & Teskey, G. C. Anandamide Signaling Augmentation Rescues Amygdala Synaptic Function and Comorbid Emotional Alterations in a Model of Epilepsy. *J Neurosci* 40, 6068-6081 (2020).
31 Stringer, C. et al. Spontaneous behaviors drive multidimensional, brainwide activity. *Science* 364, 255 (2019).
32 Lin, I. C., Okun, M., Carandini, M. & Harris, K. D. The Nature of Shared Cortical Variability. *Neuron* 87, 644-656 (2015).
33 Avitan, L. & Stringer, C. Not so spontaneous: Multidimensional representations of behaviors and context in sensory areas. *Neuron* 15, 00588-00588 (2022).
34 Kenet, T., Bibitchkov, D., Tsodyks, M., Grinvald, A. & Arieli, A. Spontaneously emerging cortical representations of visual attributes. *Nature* 425, 954-956 (2003).
35 Xiao, D. et al. Mapping cortical mesoscopic networks of single spiking cortical or sub-cortical neurons. *Elife* 6, 19976 (2017).
36 Silasi, G., Xiao, D., Vanni, M. P., Chen, A. C. & Murphy, T. H. Intact skull chronic windows for mesoscopic widefield imaging in awake mice. *J Neurosci Methods* 267, 141-149 (2016).
37 Katz, R. On some criteria for estimating the order of a Markov chain. *Technometrics* 23, 243-249 (1981).
38 Liu, K., Sibille, J. & Dragoi, G. Generative Predictive Codes by Multiplexed Hippocampal Neuronal Tuplets. *Neuron* 99, 1329-1341 e1326 (2018).

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A method of assessing for a change in cortical spatiotemporal dynamics, the method comprising generating a first and a second neural barcode, and comparing the first neural barcode and second neural barcode, wherein the first neural barcode and the second neural barcode are each generated by a method comprising:
    acquiring dynamic mesoscale imaging from a subject's brain,
    applying a state-space discretization to the dynamic mesoscale imaging to obtain a plurality of zones, wherein each zone in the plurality of zones is a cluster of interest,
    tracking dynamics in the mesoscale imaging, or magnetic resonance imaging, or spectroscopy imaging, or electroencephalography, or magnetoencephalography or neural activity data, from one zone to a next zone;
    creating a transitional probability matrix to define the probability of crossing from one zone to the next zone,
    determining an occupancy distribution of each zone, and
    constructing, by the processing device, a neural barcode by unwrapping each transition probability matrix row by row and concatenating with the occupancy distribution.

2. The method of claim 1, wherein the first neural barcode is a normative neural barcode and the second neural barcode is from a subject.

3. The method of claim 2, wherein the subject is suspected of having a neurological or neuropsychiatric disease.

4. The method of claim 2, wherein the first and second neural barcodes are from the same individual and the first neural barcode is from a first time point and the second neural barcode is from a second time point and wherein the method assess change in cortical spatiotemporal dynamics in an individual.

5. The method of claim 4, wherein the method is for assessing disease progression.

6. The method of claim 4, wherein between the first time point and the second time point the individual has received a treatment.

* * * * *